(12) United States Patent
Bouchôou et al.

(10) Patent No.: US 11,428,003 B2
(45) Date of Patent: Aug. 30, 2022

(54) CONSTRUCTION SYSTEM WITH CROSSED STRUCTURAL BOARDS

(71) Applicant: LEKO FRANCE, Chavelot (FR)

(72) Inventors: Jeanne Bouchôou, La Garde (FR);
François-Xavier Cordier, Metz (FR);
Gael Defer, Bocquegney (FR); Romain Munsch, Les Forges (FR)

(*) Notice: Subject to any disclaimer, the term of this patent is extended or adjusted under 35 U.S.C. 154(b) by 0 days.

(21) Appl. No.: 16/338,932

(22) PCT Filed: Oct. 3, 2017

(86) PCT No.: PCT/FR2017/052723
§ 371 (c)(1),
(2) Date: May 6, 2019

(87) PCT Pub. No.: WO2018/065729
PCT Pub. Date: Apr. 12, 2018

(65) Prior Publication Data
US 2019/0249431 A1 Aug. 15, 2019

(30) Foreign Application Priority Data
Oct. 3, 2016 (FR) ...................................... 1659517

(51) Int. Cl.
*E04C 2/40* (2006.01)
*B27M 3/00* (2006.01)
(Continued)

(52) U.S. Cl.
CPC ............... *E04C 2/40* (2013.01); *B27M 3/006* (2013.01); *B32B 3/10* (2013.01); *B32B 3/30* (2013.01);
(Continued)

(58) Field of Classification Search
CPC . B27M 3/006; B32B 3/10; B32B 3/30; B32B 7/08; B32B 21/042; B32B 21/13;
(Continued)

(56) References Cited

U.S. PATENT DOCUMENTS 1,507,813 A * 9/1924 Carter ..................... E04F 15/04
  52/586.1
1,622,962 A * 3/1927 Michod ..................... E04B 1/10
  52/210
(Continued)

FOREIGN PATENT DOCUMENTS

DE 202 16 634 U1 1/2003
EP 2 821 191 A1 1/2015
(Continued)

OTHER PUBLICATIONS

International Search Report (PCT/ISA/210) issued in PCT/FR2017/052723, dated Nov. 15, 2017.
(Continued)

*Primary Examiner* — James M Ference
(74) *Attorney, Agent, or Firm* — Amardeep S. Grewal; Reed Smith LLP

(57) ABSTRACT

A construction system includes a set of constituent elements, at least one of which includes at least two superimposed folds each including at least two wooden structural boards. In this system, at least two constituent elements are fixed together by a non-adhesive fixing device and at least two adjacent folds are held against each other by non-adhesive holding device. The faces in contact with two structural boards are at least partially provided, at their contact interface, with a set of grooved patterns arranged so as to prevent the structural boards from sliding one relative to the other along at least one first immobilisation axis. A method for manufacturing such a construction system is also disclosed.

18 Claims, 15 Drawing Sheets

(51) Int. Cl.
*E04B 1/10* (2006.01)
*E04B 2/70* (2006.01)
*E04C 2/12* (2006.01)
*E04C 2/42* (2006.01)
*B32B 3/10* (2006.01)
*E04H 9/02* (2006.01)
*B32B 3/30* (2006.01)
*B32B 21/04* (2006.01)
*E04B 1/26* (2006.01)

(52) U.S. Cl.
CPC ............. *B32B 21/042* (2013.01); *E04B 1/10* (2013.01); *E04B 1/2604* (2013.01); *E04B 2/707* (2013.01); *E04C 2/12* (2013.01); *E04C 2/422* (2013.01); *E04H 9/021* (2013.01); *B32B 2419/00* (2013.01); *E04B 2001/262* (2013.01)

(58) Field of Classification Search
CPC ............. B32B 21/14; B32B 2307/102; B32B 2307/3065; B32B 2419/00; E04B 1/10; E04B 1/2604; E04B 2/707; E04B 2001/262; E04C 2/12; E04C 2/40; E04C 2/422; E04H 9/021
See application file for complete search history.

(56) References Cited

U.S. PATENT DOCUMENTS

| | | | | |
|---|---|---|---|---|
| 2,104,307 A * | 1/1938 | Miller | ...................... | E04F 15/04 144/354 |
| 2,329,041 A * | 9/1943 | Ford | ........................ | E04B 1/10 52/639 |
| 2,869,355 A * | 1/1959 | Truman | ................... | E04B 2/04 52/422 |
| 3,534,515 A * | 10/1970 | Beed | ........................ | E04B 1/18 52/92.2 |
| 3,634,990 A * | 1/1972 | Pugh | ........................ | E04B 1/10 52/592.4 |
| 4,624,295 A * | 11/1986 | Howland | ................. | B27F 1/00 144/347 |
| 4,648,216 A * | 3/1987 | Reaves | ..................... | E04B 1/26 52/639 |
| 6,125,607 A * | 10/2000 | Poce | ................... | B27M 3/0053 52/847 |
| 6,389,778 B1 * | 5/2002 | Strange | ..................... | E04B 1/08 52/210 |
| 6,534,143 B1 * | 3/2003 | Thoma | ...................... | B32B 7/08 428/44 |
| 7,331,270 B2 * | 2/2008 | Booher | ................. | F41H 5/0485 109/49.5 |
| 7,634,888 B2 * | 12/2009 | Cloyd | ...................... | E04B 1/10 52/638 |
| 8,490,355 B2 * | 7/2013 | Walker | .................... | B32B 3/085 428/105 |
| 8,530,027 B2 * | 9/2013 | Kozar | ..................... | B29C 70/26 428/99 |
| 8,534,018 B2 * | 9/2013 | Walker | ..................... | E04C 2/34 428/105 |
| 9,050,766 B2 * | 6/2015 | Walker | ................... | B29D 28/00 |
| 9,091,049 B2 * | 7/2015 | Walker | ..................... | E04B 7/20 |
| 2010/0326011 A1 * | 12/2010 | Norling | ..................... | B27D 1/04 52/796.1 |
| 2011/0099935 A1 * | 5/2011 | Dorozhkin | ........... | B27M 3/0046 52/592.1 |
| 2011/0203203 A1 * | 8/2011 | Riviere | ................... | E04B 2/705 52/233 |
| 2012/0017525 A1 * | 1/2012 | Knapp | ................ | E04F 13/0866 52/173.1 |
| 2012/0174518 A1 * | 7/2012 | Litaize | .................... | B28B 19/00 52/582.1 |
| 2012/0186184 A1 * | 7/2012 | Mencio | ............... | E04D 13/1618 52/588.1 |
| 2012/0285116 A1 * | 11/2012 | Walker | ..................... | E04C 2/34 52/741.4 |
| 2014/0360122 A1 * | 12/2014 | Oros | ......................... | F16B 3/00 52/590.1 |
| 2015/0191917 A1 * | 7/2015 | Chou | .................... | E04F 15/045 52/588.1 |
| 2015/0218811 A1 * | 8/2015 | Bourdon | ................. | B32B 5/142 428/114 |
| 2016/0332411 A1 * | 11/2016 | Weissteiner | .............. | E04C 2/46 |
| 2019/0249431 A1 * | 8/2019 | Bouchoou | .............. | B27M 3/006 |

FOREIGN PATENT DOCUMENTS

FR 2 737 745 A3 2/1997
WO WO 2013/150188 A1 10/2013

OTHER PUBLICATIONS

Public Sénat / WiSEED, "LEKO startup de WiSEED sur Public Sénat", XP054977857, Feb. 18, 2018, URL: https://www.youtube.com/watch?v=igHQNyyWfEw, retrieved Nov. 3, 2017, 4 pages.

S. Girardon et al., "Amelioration des performances mecaniques des assemblages bois sur bois chevilles par preparation des interfaces", 21eme Congres Francais de Mecanique, Aug. 26-30, 2013.

Mdc Jean François Bocquet, "Conception automatisée de murs bois", Feb. 26, 2014.

L. Bleron et al., "Classement mécanique et valorisation du chêne en structure", Conference Orléans 2015.

* cited by examiner

CONSTRUCTION SYSTEM WITH CROSSED STRUCTURAL BOARDS

The present invention relates to the field of construction systems intended for the construction of wooden elements such as dwellings or small collective accommodation.

Different techniques are already known for designing and manufacturing construction system from mainly wooden elements.

A first technique, called "TFW" or "Timber Frame Wall", consists of a frame composed of wooden mounts and crossbeams assembled to each other. These frame elements are manufactured from timber machined to the desired dimensions, manually and/or with numerical control machines. The assembly of the frame is done then using rod-type members (tips, screws, bolts, etc.) which connect the mounts to the crossbeams so as to form a structural frame on which the bracing panels (generally "OSB", or "Oriented Strand Board") are fixed. These units are called "panels" of walls and improve all the mechanical stresses of the structure. This frame, by definition a carrier, can be completed in a workshop or on a site with a blasted or laid thermal insulation (insulating panels), but also with films to seal against water and/or air and/or other functional elements, such as a fireguard or a soundproofing.

This first "TFW" technique mainly has two disadvantages. The first disadvantage is the difficulty to completely automate the assembly which still demands a human operator, even on the most developed lines. The manufacturing of a construction system by "TFW" leads to an increased manufacturing cost, because of the necessary manpower.

The second disadvantage of this technique resides in the significant quantity of glue that it requires. Indeed, the panels used for the bracing such that the OSB is, in part, composed of glue. Yet, the glue is unsuitable from an environmental standpoint because of the particularly damaging ecological impact and the quantity of it must therefore be avoided or, at the very least, limited. Furthermore, the assembly of the bracing panels with each other is done only by rod-type members. In the case of an earthquake, these members therefore tend to be laminated (i.e. be deformed), such that the structure will only resist only one single earthquake.

A second technique, called "CLT" (Cross Laminated Timber), consists of being able for each of the constituent elements of a set of folds (or layers) superimposed on each other. These folds each comprise a set of wooden structural boards, arranged after each other and parallel to each other. They are moreover arranged, against each other, such that the boards of a fold are orthogonal to the boards of an adjacent fold. The constituent elements are manufactured by successively preparing the folds, then by superimposing these folds, such that one of the faces of the boards of a fold is in contact with one of the faces of the boards of an adjacent fold, which defines a contact interface. Glue is arranged at the contact interfaces, in order to retain the boards—and therefore the folds—against each other.

This second "CLT" technique has the same disadvantage of widespread use of glue, with the environmental impact thereof, but problems linked to industrialisation and mechanical resistance are added. First, the glue requires a significant pressing time and a significant drying time, which equally slows down the production. Furthermore, the aim of these panels being to create a solid wall, the insertion of functional boards cannot be achieved. The functional boards must therefore be added later, which has the effect of slowing down the fitting on the site. Second, when an opening must be arranged in one of the constituent elements (for example, for a window), the "CLT" technique requires the post-gluing machining of this element, leading to a loss of time and material. These disadvantages are passed onto the sale price.

A third technique has been disclosed in the international application number WO 2013/150188. This consists of forming each constituent element of a set of superimposed folds, each fold comprising a set of wooden structural boards, parallel to each other, but contrary to the "CLT" technique, the structural boards are removed from each other. On each fold, functional folds (for example, for a thermal insulation and/or soundproofing, thermal inertia, fire resistance function, or for any other complementary function) are arranged in the clearances between the structural boards, according to an alternation of structural and functional boards. Finally, similarly to the "CLT" technique described above, the folds are arranged "crossed" with each other (i.e. such that the boards of a fold are orthogonal to the boards of an adjacent fold) and are furthermore retained against each other by arranging glue, on contact interfaces between the faces of the boards of two adjacent folds.

In this third technique, the clearance between the structural boards makes it possible to insert functional boards at the manufacturing stage in the factory, which, on the one hand, avoids the later fitting of the functional boards on site and, on the other hand, limits the quantity of wood lost when an opening must be arranged. However, the still widespread use of glue induces the abovementioned disadvantages in terms of the environment and industrialisation, but also disadvantages in terms of seismic resistance, as the glued assemblies have no plasticity and will therefore suddenly break in case of too high dynamic stresses.

The aim of the present invention is to provide a construction system requiring the least glue as possible, both for limiting the environmental impact, and for making it possible for an automated manufacturing of the constituent elements and confer to the construction system, a greater resistance to earthquakes.

To this end, the present invention aims for a construction system, comprising a set of constituent elements, at least one of which comprises at least two superimposed folds, each comprising at least two wooden structural boards, a face of at least one structural board of one of said folds being in contact with a face of at least one structural board of an adjacent fold on a contact interface. According to the invention, at least two of the constituent elements are fixed together by way of non-adhesive fixing means, at least two adjacent folds among the superimposed folds of one same constituent element are retained against each other by way of non-adhesive holding means and the faces in contact are at least partially provided, on the contact interface, of a set of grooved patterns arranged so as to prevent the sliding of said structural boards against each other along at least one first immobilisation axis.

Thanks to the grooved patterns, two structural boards can be retained against each other, along at least one first immobilisation axis in the plane of the contact interface, without requiring arranging glue on the contact interface thereof. Below, the non-adhesive holding means between the folds make it possible for an immobilisation along a normal axis to the contact interface, always without requiring glue. Resorting to additional fixing means between the constituent elements, once again non-adhesive, also makes it possible to abstain from the use of glue.

Consequently, a construction system according to the invention makes it possible to avoid—or at the very least to limit—the use of glue. It results that all of the problems linked to the glue can be overcome: the ecological footprint of the system is better, them constituent elements can be manufactured in an industrialised manner without any delay linked to the time for pressing and drying the glue, and finally the resistance of the system to earthquakes is improved, thanks to the possible lamination of the assemblies by grooved patterns.

From the industrial standpoint, in addition to the absence of glue, the grooved patterns have the additional effect of forming markers making it possible to precisely achieve the assembly of the structural boards to each other (i.e. such that the grooved patterns of adjacent structural boards are interlocked). The assembly can now be effectively achieved by a Cartesian robot on a production line.

From the mechanical standpoint, the plasticity zone of an assembly by grooved patterns is higher than that of an assembly by glue. Indeed, it has proved to be, that by making an assembly work by grooved patterns above the elastic threshold thereof, this tends to be laminated and to be deformed, but without breaking. Thus, in case of an earthquake, contrary to an assembly by glue, an assembly by grooved patterns makes it possible to absorb a significant quantity of energy in the plane of the contact interface (which includes the immobilisation axis/axes) and therefore to effectively resist any type of shock.

Another major advantage of the invention, is that it makes possible the use of deciduous wood (hardwood) to form the structural boards. Indeed, generally wood is classified into two categories: softwood (resinous wood) and hardwood. Softwood being cheaper than hardwood, it is preferred for the drying facility thereof in the field of construction for several decades, despite the higher mechanical resistance for hardwood. Furthermore, the softwood market is becoming competitive, and the European resource being mainly composed of hardwood, the development of constructive solutions such as the present invention is necessary. The price of hardwood is fixed according to the visual appearance, consequently the market of woods deemed unsightly is abandoned for that of firewood. However, the mechanical resistances not being correlated to the visual appearances thereof, the invention therefore makes the production of a hardwood construction system perfectly suitable. Furthermore, the machinability of the grooves being closely linked to mechanical resistances, this is thus found to be facilitated with hardwood.

In a specific embodiment of grooved patterns, these comprise a first series of parallel grooves and a second series of parallel grooves, respectively oriented along a first axis and a second, non-parallel axis. When two adjacent folds are superimposed, these two series of parallel grooves, distributed on the contact interface between the faces of the structural boards which come into contact (one on the structural board of a fold and the other on the structural board of the adjacent fold), can be interlocked into each other, and thus immobilise the sliding of the two boards along the first immobilisation axis. These patterns thus make it possible for an immobilisation along at least one plane of the contact interface and can furthermore be machined relatively simply (parallel grooves can be easily made by a machining passing through the width or length of the board).

According to an advantageous embodiment, on at least one contact interface, the face of a board is equipped with a first series of parallel grooves oriented along a first axis and the face of the other board is equipped with a first series of parallel grooves oriented along a first axis and a second series of parallel grooves oriented along a second axis, not parallel to the axis of grooves of the first series, so as to prevent the sliding of said structural boards against each other along said first immobilisation axis. This configuration makes it possible to prevent the relative sliding of two adjacent folds along an immobilisation axis in the plane of the contact interface, by a single set of grooves and teeth arranged suitably on the boards of the constituent element. This makes it possible to achieve an immobilisation simply, since all that it needed, is to machine the faces of the boards along the lengths thereof and/or the widths thereof to form the grooves and/or teeth.

Preferably, in addition to the first immobilisation axis, the grooved patterns are arranged also to prevent the sliding of structural boards against each other along at least one second immobilisation axis not parallel to the first immobilisation axis. Thus, the structural boards can be retained together along at least two immobilisation axes, not parallel to each other, but both situated in the plane of the contact interface. In other words, the structural boards are retained against each other over the whole plane of the contact interface, in addition to the holding along the normal axis to the contact interface (by way of holding means). The result of this is a reinforcement of the holding of the structural boards. It is understood, that when grooved patterns have been applied on one same face and along two non-parallel axes, this results in patterns in the shape of a tooth matrix, of which it all efficiently acts in the plastic field in case of high mechanical stress and, through this, in terms of resistance to earthquakes.

In a specific embodiment of grooved patterns, these comprise a first series of parallel grooves and a second series of parallel grooves, oriented respectively along a first axis orthogonal to the first immobilisation axis and a second axis orthogonal to the second immobilisation axis. It is understood that the immobilisation of these two non-parallel axes, involves the immobilisation of the rotation (and more generally, the movement in all directions) in the plane of the interface. In this case, each of the boards is provided with two series of grooves. Subsequently, when two adjacent folds are superimposed, these series can be interlocked in each other (i.e. the first series of the first board is interlocked with the second series of the second board, to block, along the first immobilisation axis, and the second series of the first board is interlocked with the first series of the second board, to block, along the second immobilisation axis). These patterns thus make it possible for an immobilisation along the two immobilisation axes, both situated in the plane of the contact interface, and can furthermore be machined relatively simply (parallel grooves can be easily achieved by a machining passing through the width or the length of the board).

According to an advantageous embodiment, on at least one contact interface, the face of a board is equipped with a first series of parallel grooves oriented along a first axis and the face of the other board is equipped with a first series of parallel grooves oriented along a first axis and a second series of parallel grooves oriented along a second axis, not parallel to the axis of the grooves of the first series, so as to prevent the sliding of said structural boards against each other along said first immobilisation axis, and on the at least one other contact interface, the face of a board is equipped with a second series of parallel grooves oriented along a second axis and the face of the other board is equipped with a first series of parallel grooves oriented along a first axis not parallel to the axis of the grooves of the second series and of a second series of parallel grooves oriented along a second axis, so as to prevent the sliding of said structural boards against each other along said second immobilisation axis. This configuration makes it possible to prevent the relative sliding of two adjacent folds (or of three adjacent folds, being understood that the first and the second fold can prevent the sliding along the first immobilisation axis and that the second and the third folds can prevent the sliding along the second immobilisation axis) in the plane of the contact interface, by a single set of grooves and teeth arranged suitably on the boards of the constituent element. This makes it possible to achieve an immobilisation in the plane of the contact interfaces simply, since all that is needed, is to machine the faces of the boards along the lengths thereof and/or the widths thereof to form the grooves and/or teeth.

Preferably on at least one portion of the contact interface between two structural boards, the grooved patterns are interlocked at least partially into each other, which makes it possible to prevent the sliding of the structural boards against each other along the immobilisation axis/axes.

The grooved patterns can be of various shapes. In particular, they can advantageously have cross-sections of substantially triangular shape. These complementary shapes make it possible to improve the interlocking of the grooved patterns into each other. The grooved patterns can also advantageously have a width at the base of between 1 and 15 millimetres and an angle at the top of between 40° and 70°. This sizing makes it possible to sufficiently arrange grooved patterns on a board of standard size and to favour the lamination of the grooved patterns in case of high stress on the boards.

Preferably, a functional board is inserted between two structural boards of one same fold. A functional board is a board fulfilling a function such as thermal insulation and/or soundproofing, thermal inertia or fire resistance. Thus, the construction system can be manufactured industrially in its entirety, i.e. including structural boards and functional boards, which avoids the fitting of the functional boards later on site and therefore makes it possible to save time and a better precision during the fitting.

In the latter case, the face of at least one structural board of an adjacent fold, oriented towards the fold, is preferably arranged on the contact interface with the grooved pattern, so as to arrange a space between the functional boards of two adjacent folds. This free space also contributes to the insulation between the two adjacent folds.

Preferably, the number of superimposed folds of the constituent element is at least equal to 3. It can advantageously be of between 5 and 15.

It is understood, that by "non-adhesive holding means" and by "non-adhesive fixing means", this means that these means mainly have no glue. In a preferred embodiment, at least some of the holding means comprise rod-type assembly members. Such a rod can, for example, be a screw. This type of assembly member is particularly effective to retain two adjacent folds against each other, without requiring glue.

Likewise, it can be advantageously provided, that at least some of the fixing means comprise rod-type and/or connector-type assembly members, which makes it possible again for a fixing without glue.

It is also understood, that the possible adding of glue residue, in order to contribute to the abovementioned holding and fixing means, does not make it possible to move away from the scope of the present invention, insofar as it is particularly important that at least one of the holding means and that at least one of the fixing means is not composed of glue, as this can be the case in the abovementioned prior techniques. While the invention proposes to mainly have holding and fixing means with no glue, it remains that the act of adding a relatively low quantity of glue to the construction system according to the present invention still makes it possible to resolve the technical problem of the limitation of the quantity of glue.

Advantageously, at least some of the structural boards are made of hardwood. This type of wood, applied to the grooved patterns according to the invention, makes it possible to reinforce the holding between two structural boards thanks to the high density of the wood, while having a downgraded and therefore potentially cheaper wood.

The present invention also aims for a method for manufacturing a construction system such as defined above, in particular comprising the following steps: (i) the machining of the faces of the structural boards intended to be in contact, so as to provide them with grooved patterns on the contact interface thereof, (ii) the putting into contact and the holding against each other of the structural boards intended to be in contact, following each other, so as to form the constituent elements, and (iii) the fixing of the constituent elements to each other. Preferably, this manufacturing methods can be implemented automatically.

Other characteristics and advantages of the invention will appear upon reading the following description of embodiments of the invention, given as examples and in reference to the appended drawings.

Figure 1:
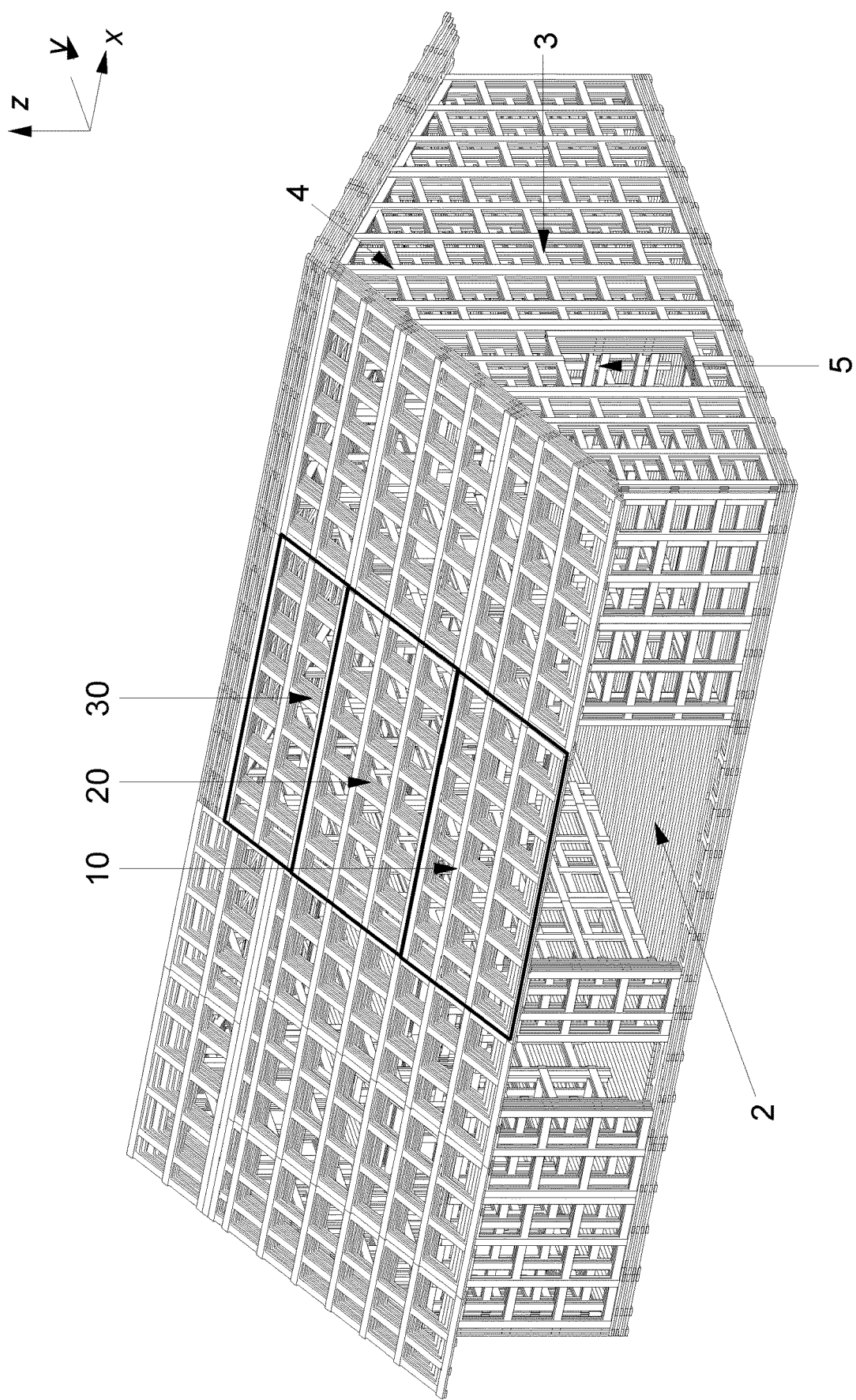
FIG. 1 is a perspective view of a construction system example according to the present invention.

In reference to FIG. 1, a construction system 1 according to the present invention can be presented in the form of a wooden dwelling, although any other forms of building can be considered. This dwelling comprises a floor 2, walls 3 and a pitched roof 4. All these elements can be made of wood. Furthermore, openings can be made in different elements of the construction system, such as the opening 5 made on a wall 3 for the apposition of a window.

In this example, the floor 2, the walls 3 and the pitched roof 4 are each formed of a set of constituent elements 10, 20, 30 . . . . As an example, each slope of the pitched roof 4 has been divided into several of these constituent elements. It will be understood, that this cutting mainly keeps to the sizing limits of standard transport in construction and industrial tools making it possible to manufacture the constituent elements.

Figure 2:
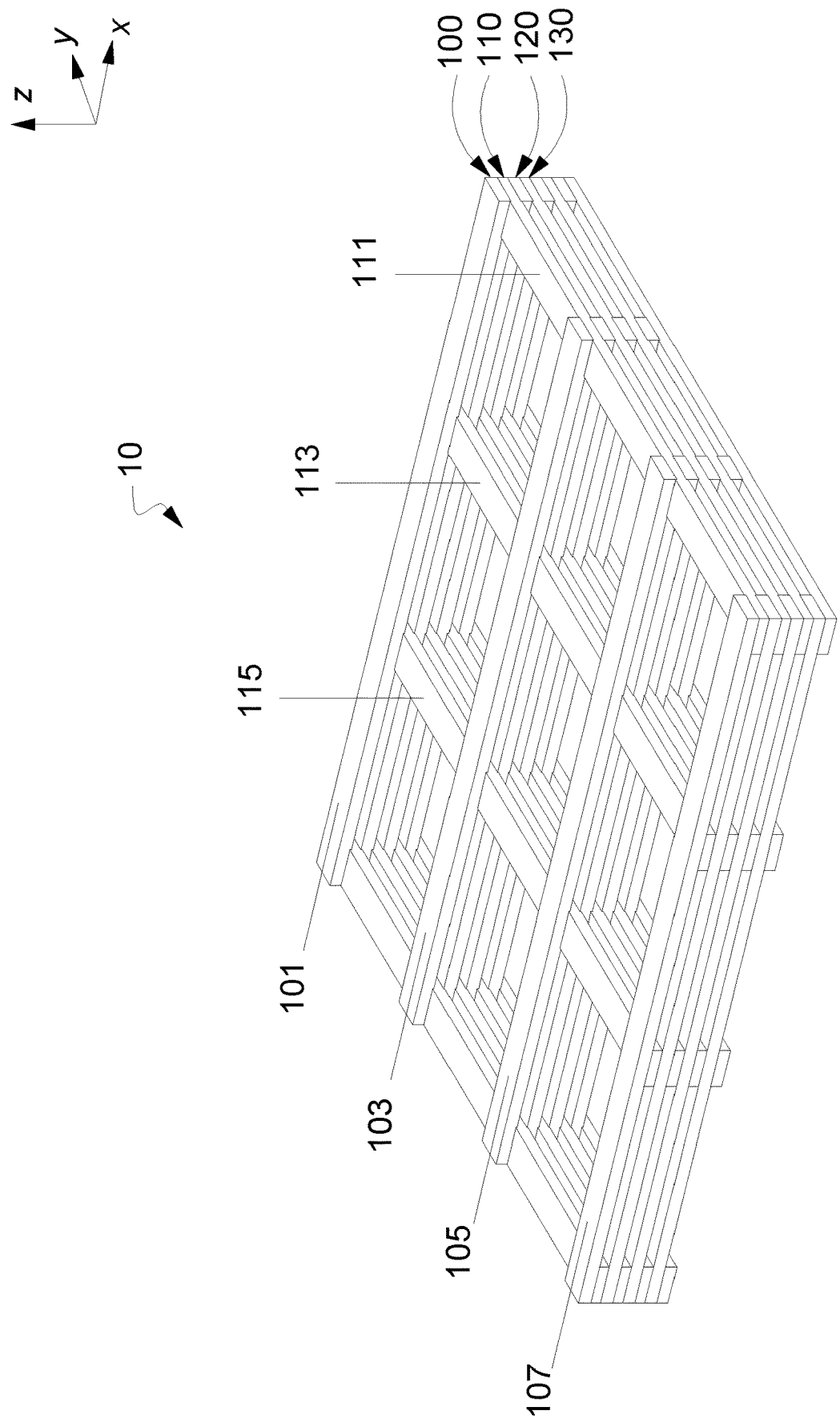
FIG. 2 is a perspective view of one of the constituent elements of the construction system of FIG. 1.

One of these constituent elements, namely the constituent element 10, is represented more specifically in FIG. 2. It comprises a set of superimposed folds 100, 110, 120 . . . in a configuration called "crossed boards". In this example, a number of folds equal to ten is provided, but a different number of folds can be provided, for example, a number greater than three and preferably of between five and fifteen, or also preferably a number of between eight and twelve. Determining the suitable number of folds is an arbitrage between the thermal performance of the constituent element, the solidity of this element (all the better that there are folds) and the overall thickness thereof (which, usually, must not exceed a certain limit).

The folds themselves each comprise wooden structural boards. The upper fold 100 comprises structural boards 101, 103, 105 . . . parallel and oriented along the axis (Oy). The fold 110, adjacent to the upper fold 100 and which itself is directly lower, itself comprises a set of structural boards 111, 113, 115 . . . parallel and oriented along the axis (Ox) perpendicular to the axis (Oy). The folds 100, 110, 120 . . . are thus alternatively formed of structural boards oriented along the axis (Oy) and of structural boards oriented along the axis (Ox). Thus, the structural boards of two adjacent folds are orthogonal to each other and form a grid pattern.

Other configurations of folds and boards however remain considerable, insofar as the boards of two adjacent folds are not parallel to each other, but remain inclined against each other by a non-zero angle (of which the value will depend on the configuration of the constituent element).

Figure 3:
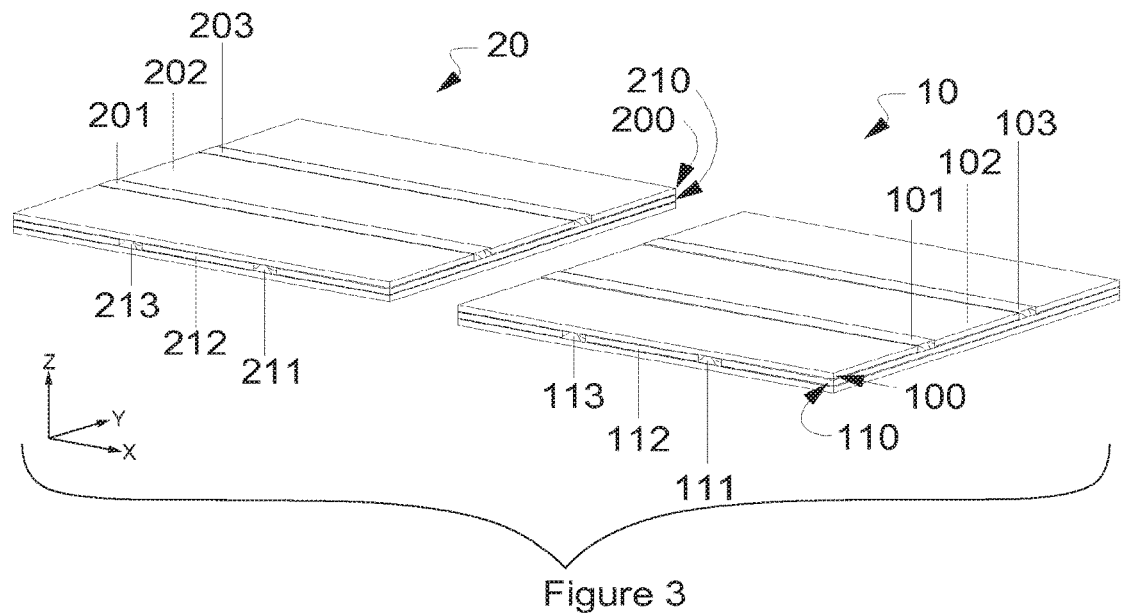
FIG. 3 is a perspective view of a portion of two constituent elements of a construction system according to the invention.
Figure 4:
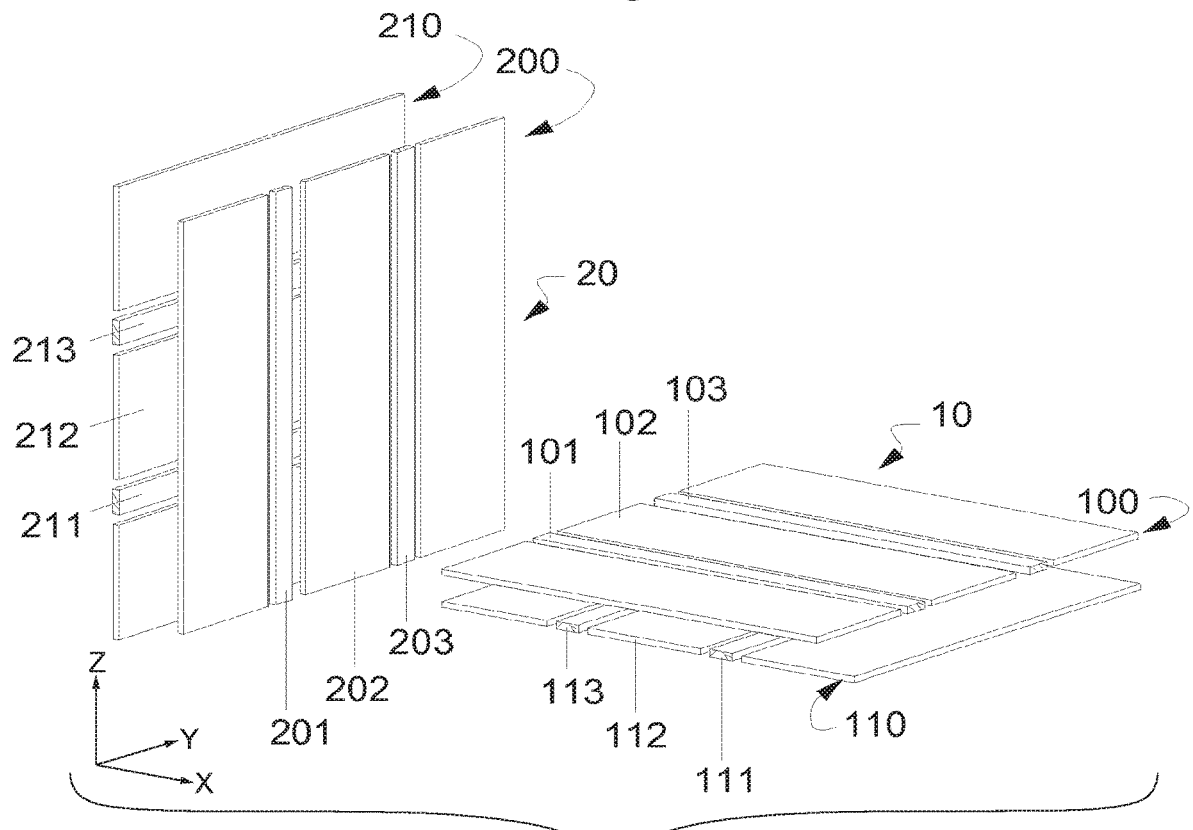
FIG. 4 is an exploded view of a portion of the two constituent elements of FIG. 3.

FIGS. 3 and 4 represent more specifically a portion of two of the constituent elements of the construction system 1, namely the elements 10 and 20. These two constituent elements are intended to be fixed to each other, as will be detailed below in reference to FIGS. 15 to 18.

As can be seen in FIGS. 3 and 4, the portion of the constituent element 10 represented on these figures comprises several superimposed folds, and in particular, the folds 100 and 110. The portion of the first fold 100 comprises two wooden structural boards 101 and 103. A functional board 102 is inserted between these two boards. This functional board 102 is intended to fulfil a specific function, different from that of the structural boards, in other words, it is not used to support the constituent element and is not made of solid wood (but it can be made of certain types of wooden insulators, such as wood wool, which are not recognised as having carrying properties). Selecting the constituent material thereof depends on the function that is sought to confer to it. This function can relate to thermal insulation and/or soundproofing, thermal inertia, fire resistance or also to any other function considered as suitable.

The portion of the second fold 110 comprises two wooden structural boards 111 and 113, between which is arranged a functional board 112. The folds 100 and 110 are adjacent and are intended to be in contact with each other, on a contact interface situated between the respective faces thereof facing each other.

Likewise, the portion of the constituent element 20 represented in FIGS. 3 and 4 comprises in particular two folds 200 and 210. The portion of the first fold 200 comprises two wooden structural boards 201 and 203, between which is situated a functional board 202. The portion of the second fold 210 comprises two wooden structural boards 211 and 213, between which is situated a functional board 212.

Figure 5:
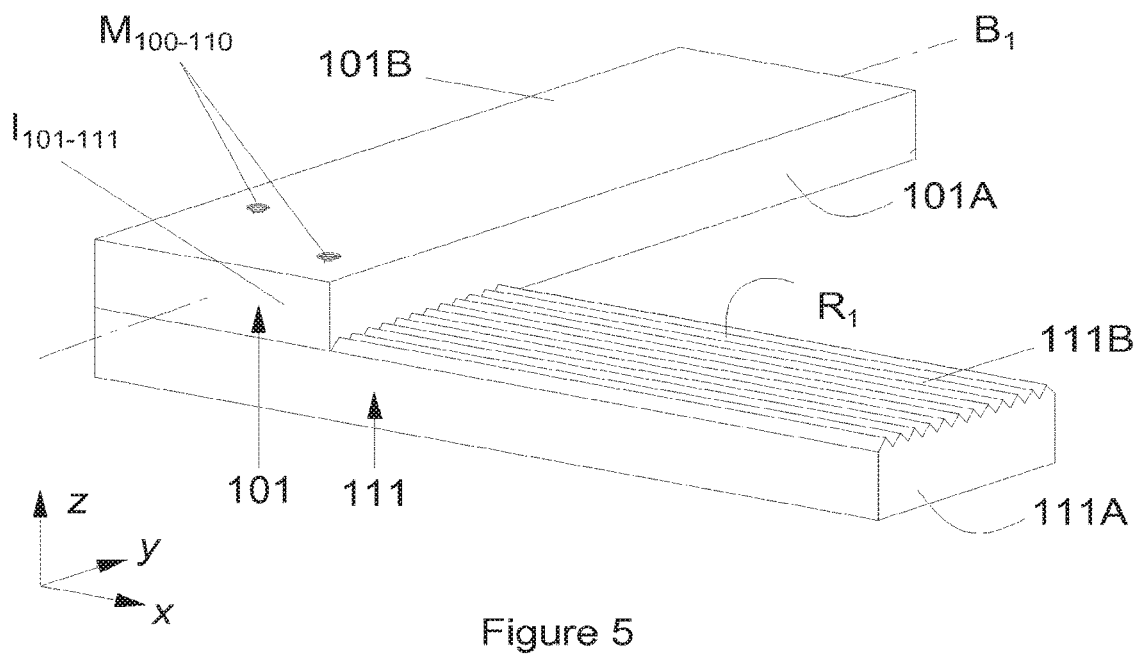
FIGS. 5 and 6 are perspective views of two structural boards put into contact according to a first embodiment.
Figure 6:
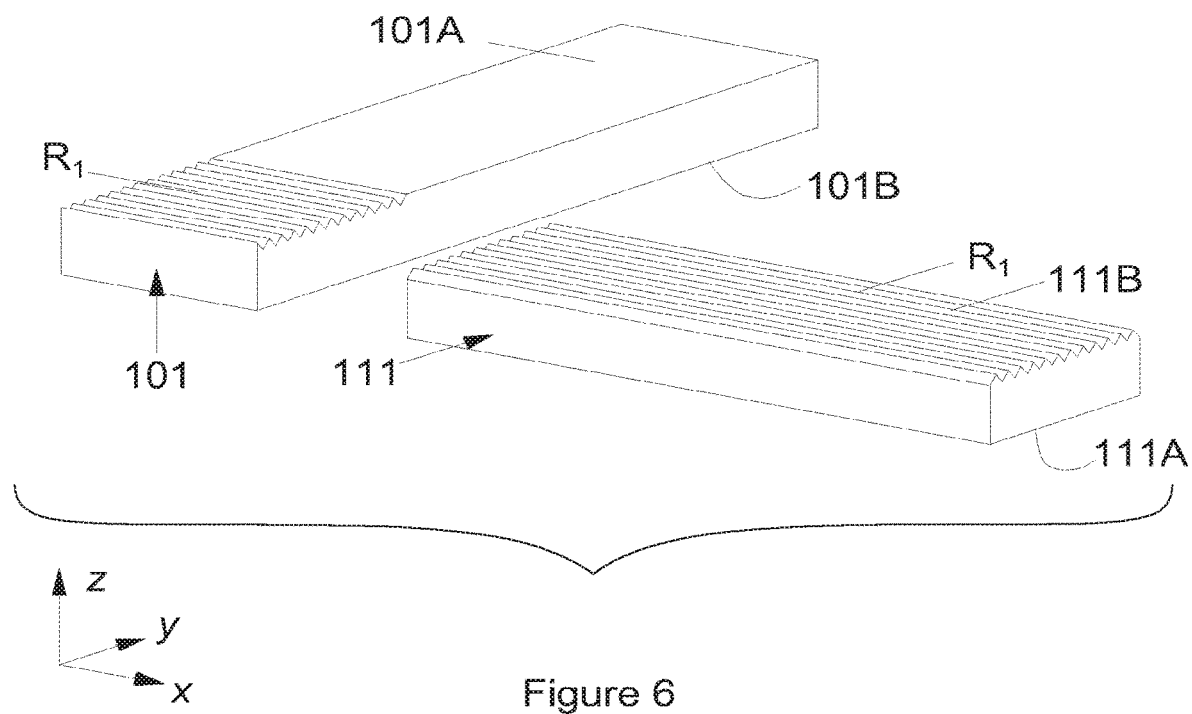

As regards the constituent element 10, FIGS. 5 to 9 represent, more specifically, the contact between two structural boards 101 and 111 of two adjacent folds 100 and 110. In FIG. 5, the structural board 101 has a lower face 101A (not visible) and an upper face 101B. Likewise, the structural board 111 has a lower face 111A (not visible) and an upper face 111B. When the folds 100 and 110 are superimposed, the structural boards 101 and 111 come into contact on a contact interface situated in the plane (Oxy). In FIG. 6, it can be seen that the lower face 101A of the board 101 is provided with a set of grooved patterns $R_1$, over the whole of the longitudinal extent thereof, i.e. along the axis (Ox). The upper face 111B of the board 111 is also provided with a set of grooved patterns $R_1$, but only on a portion of the transversal extent thereof, also along the axis (Ox). On the faces 101A and 111B, the grooved patterns $R_1$ are identical and form a series of grooves, parallel to each other. In this example, the patterns have a cross-section of triangular shape, although other shapes can be considered, as will be seen in reference to FIGS. 10 to 14.

Thus, when the structural board 101 bears against the structural board 111, the grooved patterns $R_2$ of the face 101A, oriented along the axis (Ox) are interlocked in the grooved patterns $R_1$ of the face 111B, also oriented along the axis (Ox). Subsequently, the grooved patterns $R_1$ prevent the sliding of the structural boards 101 and 111 against each other along a first immobilisation axis $B_1$, parallel to the axis (Oy). This prevention is obtained without it having needed to arrange the glue on the contact interface and therefore without leading to the disadvantages of the glue, in particular in ecological, mechanical and industrial terms. Moreover, as mentioned above, these grooved patterns can be used as markers for the interlocking of the boards to each other and therefore for the relative arrangement of the boards in the scope of an automated manufacturing.

Figure 7:
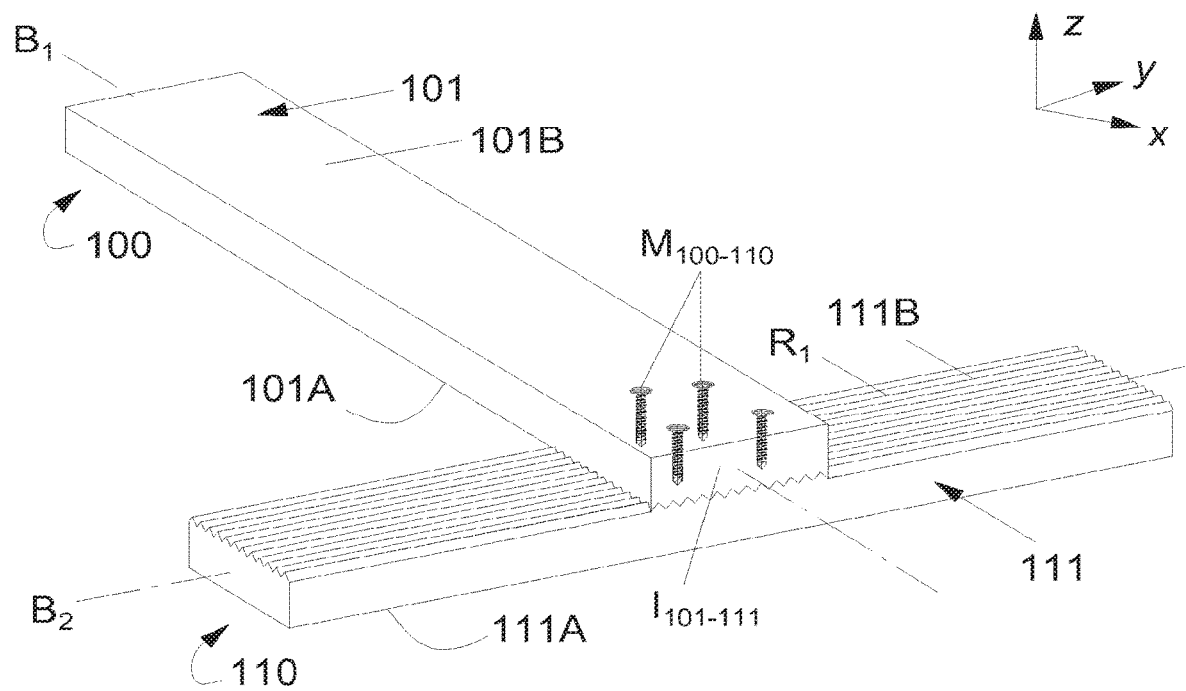
FIGS. 7 and 8 are perspective views of the two structural boards of FIGS. 5 and 6 to which are associated, holding means.
Figure 8:
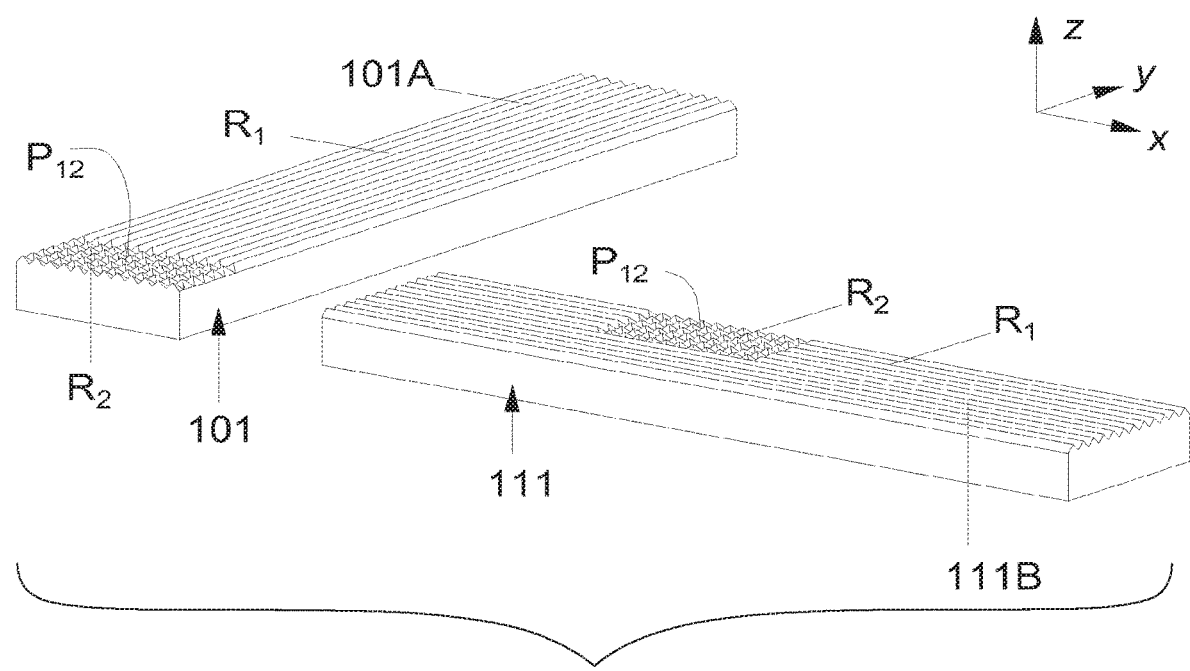
Figure 9:
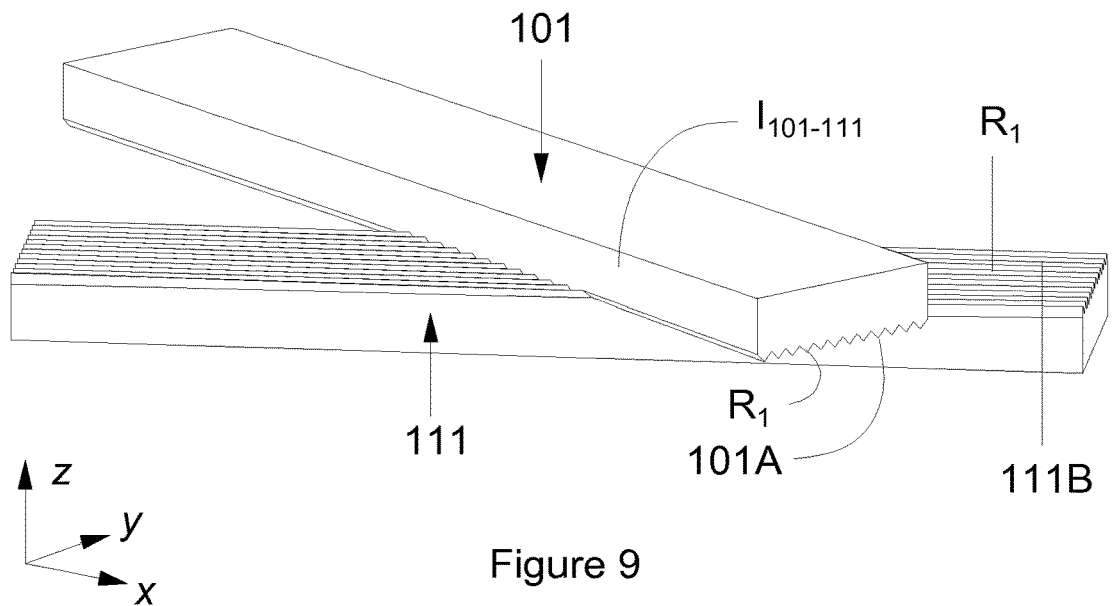
FIG. 9 is a perspective view of two structural boards in contact according to a second embodiment.

Now in reference to FIGS. 7 and 8, the two boards 101 and 111 can be retained against each other by way of holding means $M_{100\text{-}110}$. According to the invention, these holding means $M_{100\text{-}110}$ have the particularity of not being made of glue, always in order to avoid—or at the very least to limit—the quantity of glue present in the construction system 1. In these figures, the holding means $M_{100\text{-}110}$ are presented in the form of four rod-type assembly members, and more specifically, in the form of a set of four screws passing through the two boards 101 and 111 on the contact interface $I_{100\text{-}111}$.

These holding means $M_{100\text{-}110}$ ensure the holding of the boards 101 and 111 against each other along the normal axis (Oz) to the plane (Oxy) of the contact interface $I_{101\text{-}111}$. They make it possible, more generally, to retain the folds 100 and 110 against each other, without requiring the least quantity of glue. It will be understood, that any other type of assembly member can be used, for example, a rod of sharp tip or twisted tip-type. Likewise, a different number of members can be considered, for example, two or five, and these members can be arranged in other places than on the contact interface $I_{101\text{-}111}$. However, it will be understood, that the holding is all the better, as the assembly members are close to the contact interface $I_{101-111}$.

In FIG. 8, it can be seen more specifically, that the face 1118 of the board 111 is provided, on the one hand, with grooved patterns $R_1$, in the form of parallel grooves arranged over the whole longitudinal extent of the board, along the axis (Oy), and on the other hand, with additional grooved patterns $R_2$, in the form of parallel grooves arranged only on one portion of the transversal extent of the board 111, along the axis (Ox), i.e. orthogonal to the grooves $R_1$. Conversely, the face 101A of the board 101 is provided, on the one hand, with grooved patterns $R_2$, in the form of parallel grooves arranged only on one portion of the transversal extent of the board 101, along the axis (Oy), and on the other hand, with additional grooved patterns $R_1$, in the form of parallel grooves arranged over the whole longitudinal extent of the board, along the axis (Ox), i.e. orthogonal to the grooves $R_2$.

In this configuration, on the contact interface $I_{101-111}$, the grooved patterns $R_1$ and $R_2$ form a tooth matrix making it possible to prevent the boards 101 and 111 from sliding against each other along two non-parallel immobilisation axes $B_1$ and $B_2$ and situated in the plane (Oxy) of the contact interface $I_{101-111}$: the first immobilisation axis $B_1$, orthogonal to the grooves $R_1$, therefore in the axis (Ox), and the second immobilisation axis $B_2$, orthogonal to the grooves $R_2$, therefore in the axis (Oy).

The configuration of FIGS. 7 and 8 makes it possible to prevent the sliding of the boards 101 and 111 in all of the plane (Oxy) of the contact interface $I_{101-111}$. The holding means $M_{100-110}$ furthermore make it possible to retain the boards 101 and 111 against each other along the normal axis (Oz) to the plane (Oxy) of the contact interface $I_{101-111}$. Subsequently, the boards 101 and 111 are assembled and retained together in the whole space (Oxyz), without requiring any deposition of glue.

It will be understood, that to ensure an immobilisation of the boards 101 and 111, all that is needed, is for the grooved patterns $R_1$ and/or $R_2$ to be arranged on at least one portion of the contact interface $I_{101-111}$. However, from the mechanical standpoint, the immobilisation of the boards will be all the better than the faces being provided with grooved patterns $R_1$ and/or $R_2$ over the whole contact interface $I_{101-111}$. Furthermore, from the industrial standpoint, the grooved patterns can be achieved by a machining of the faces 101A and 111B. In this case, the machining can be carried out more easily and quickly over the whole length of the boards, rather than over only one portion of these.

In the examples above, the boards 101 and 111 are orthogonal to each other and the immobilisation axes $B_1$ and $B_2$ are themselves orthogonal. In another example, illustrated by FIG. 9, the boards 101 and 111 are not orthogonal, but inclined against each other by an angle close to 45°. In this case, the grooves $R_1$ and $R_2$ are oriented along the two axes of the boards, respectively 111 and 101, and the immobilisation axes $B_1$ and $B_2$ are each orthogonal to one of the boards. The invention more generally covers any inclination possible between two structural boards.

In order to reinforce the mechanical connection between the grooved patterns $R_1$. and/or $R_2$ of the two boards 101 and 111, the latter are made of hardwood. This type of wood has a greater density, which makes the grooved patterns—small in size and therefore potentially fragile—more solid and less capable of being broken under the effect of a high mechanical stress. Furthermore, the resistance of the assembly having been improved, the invention makes it possible to resort to hardwood with lesser cross-sections and a lesser quality, which makes it possible for a saving during the purchase of the raw material.

Figure 10:
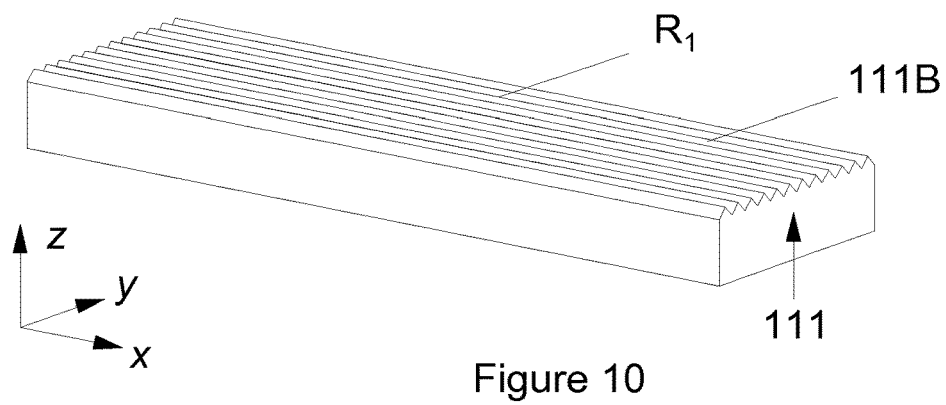
FIGS. 10 to 14 are perspective views of five embodiment examples of grooved patterns according to the present invention.
Figure 11:
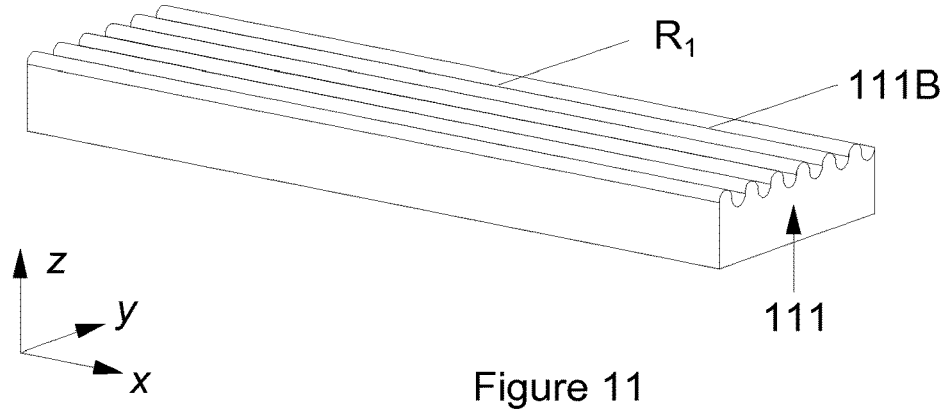
Figure 12:
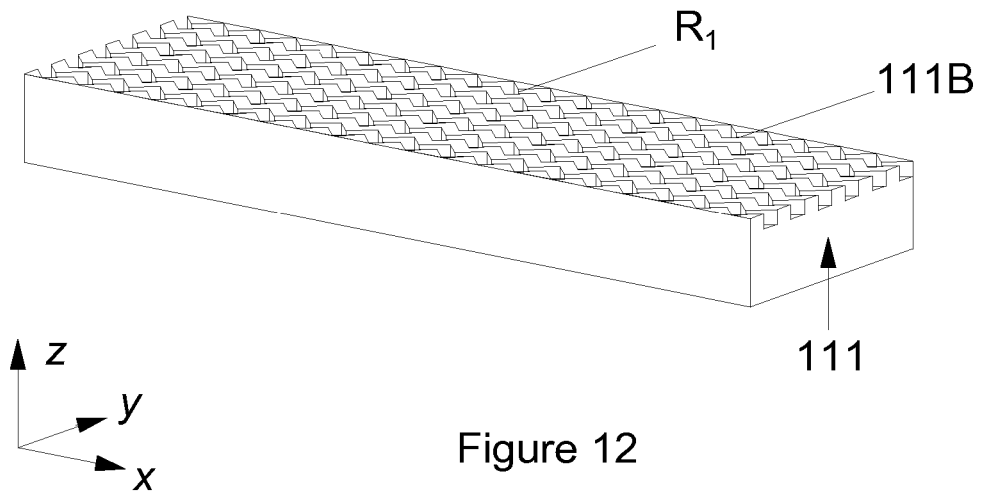

FIGS. 10 to 14 illustrate different examples of grooved patterns could be considered according to the invention. In FIGS. 10 to 12, one single type of grooved patterns is shown, namely parallel grooves $R_1$ along the longitudinal axis of the board 111. In FIG. 10, the grooves $R_1$ are of a triangular cross-section, which gives the face 111B an overall sawtooth pattern. In FIG. 11, the grooves $R_1$ have a rounded cross-section, which confers to the face 111B, an overall wave-shaped pattern. In FIG. 12, the grooves $R_1$ have a square cross-section, which confers to the face 111B, an overall slot-shaped pattern, but the grooves furthermore have a zigzag shape over the longitudinal extent thereof. According to needs, other forms of grooved patterns could also be considered.

Figure 13:
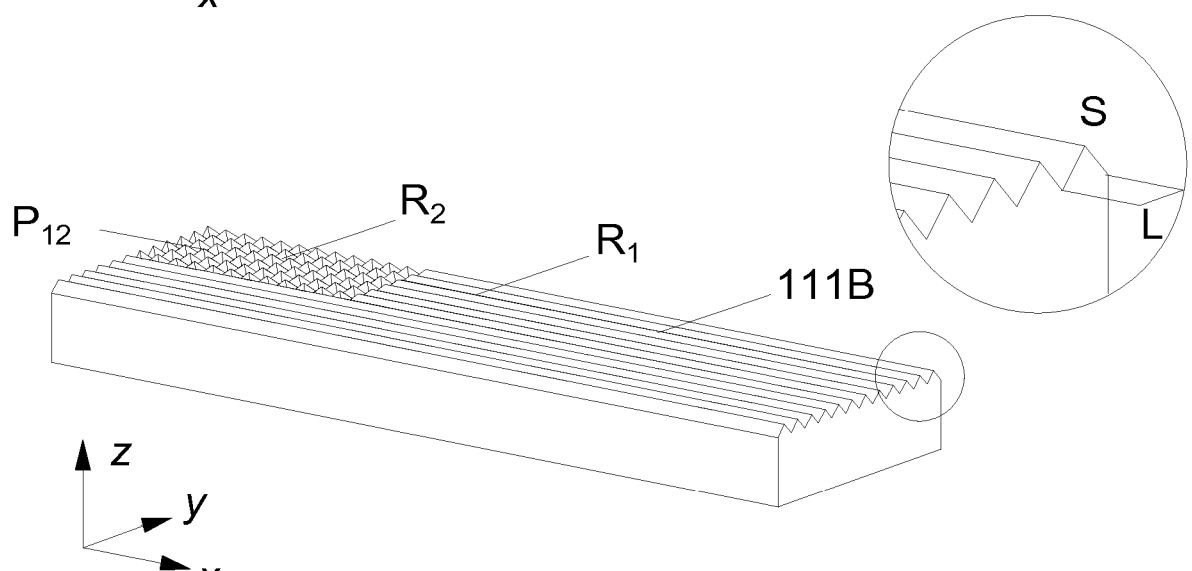
Figure 14:
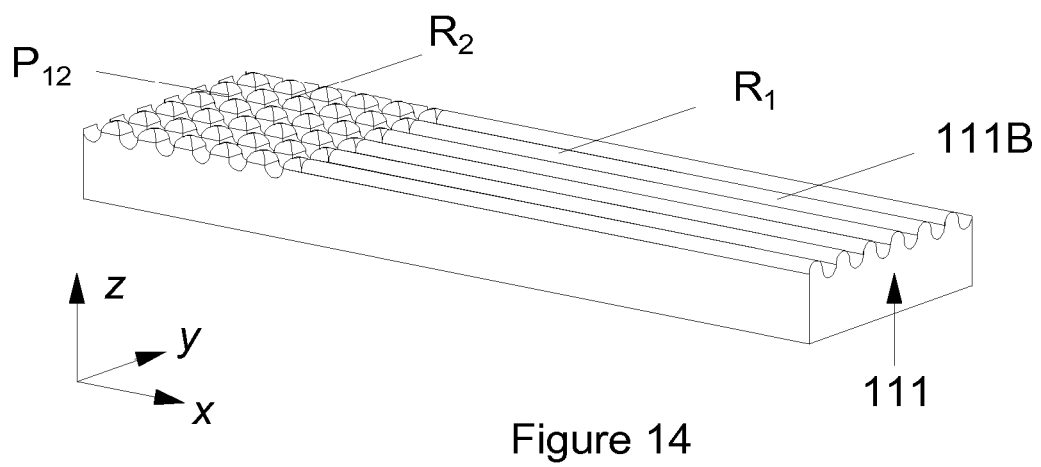

In FIGS. 13 and 14, now, two types of grooves are found: the parallel grooves $R_1$ along the longitudinal axis of the board 111 and the parallel grooves $R_2$ along the transversal axis of this same board 111. In FIG. 13, the grooves $R_1$ are arranged along the axis (Ox) over the whole longitudinal extent of the board 111, and the grooves $R_2$ are arranged along the axis (Oy) on a portion of the transversal extent of the board 111, without however fully passing through the width of the board. In FIG. 14, the grooves $R_1$ are arranged in the same manner as in FIG. 14, but the grooves $R_2$ are arranged along the axis (Oy) fully pass through the width of the board.

In both cases, the face 111B comprises two separate zones: a first zone only constituted of parallel grooves $R_1$ (for an immobilisation along an axis) and a second zone constituted of teeth $P_{12}$ formed by the crossing of the grooves $R_1$ and $R_2$ (for an immobilisation along two axes).

In terms of dimensions, the grooves $R_1$ and $R_2$ can have a cross-section with the base L (visible in FIG. 11) of between 1 and 15 millimetres, preferably of between 5 and 10 millimetres. The angle at the top S can be of between 40° and 70°. In the case of the teeth $P_{12}$ (formed by a matrix of grooves $R_1$ and $R_2$), these can also have a base of length and width of between 1 and 15 millimetres and an angle at the top S of between 40° and 70°.

FIGS. 15 to 18 illustrate different examples of fixing two constituent elements according to the present invention.

Figure 15:
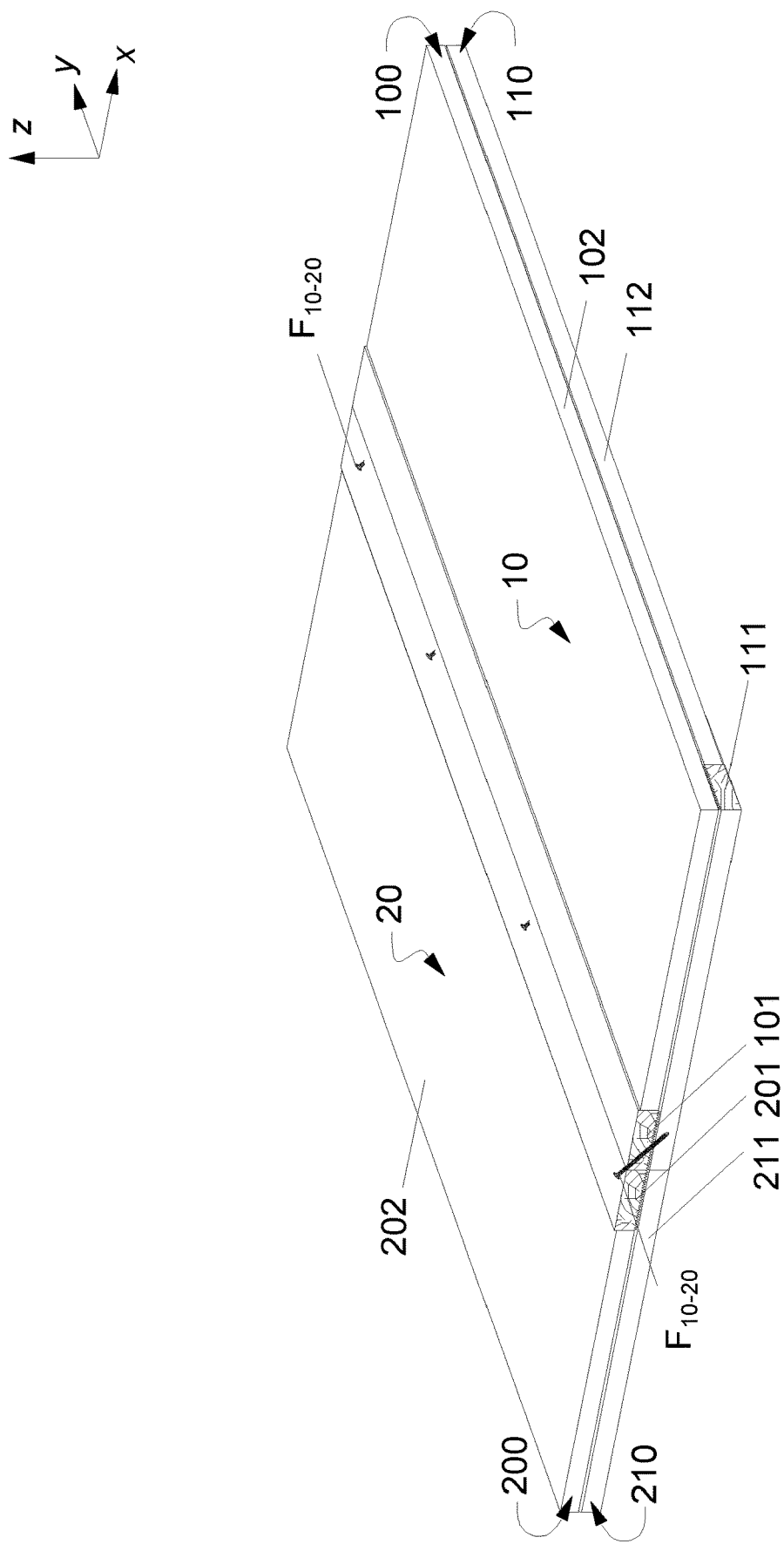
FIG. 15 is a perspective view illustrating the fixing of two constituent elements, each constituted of two superimposed folds.
Figure 16:
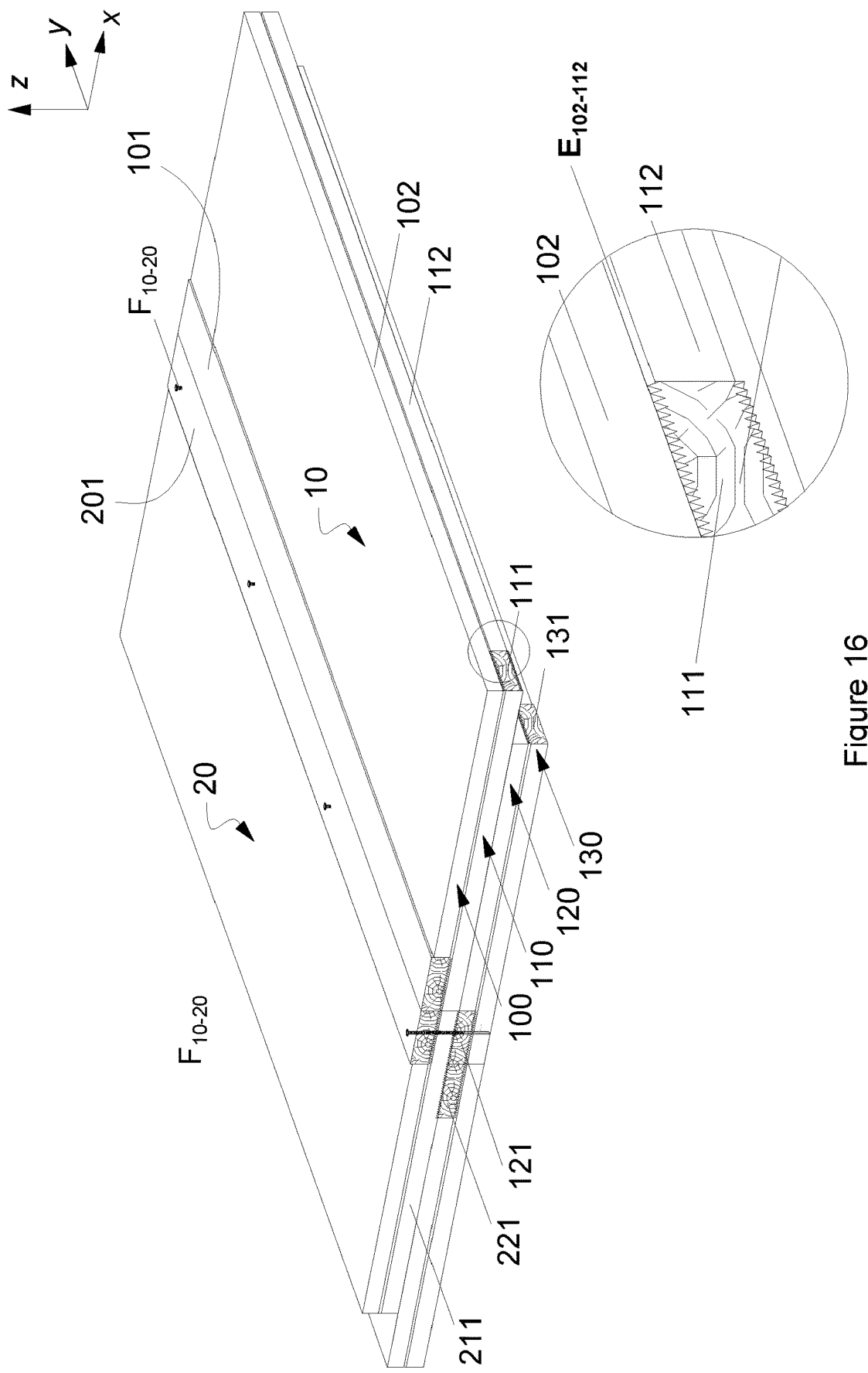
FIG. 16 is a perspective view illustrating the fixing of two constituent elements, each constituted of four superimposed folds.

FIGS. 15 and 16 represent the case of two parallel constituent elements 10 and 20, fixed on the side walls thereof. In FIG. 15, each constituent element is formed of two folds each comprising several structural boards. For simplicity reasons, the folds 100, 110, 200 and 210 are represented with a structural board (respectively 101, 111, 201 and 211) and a functional board (respectively 102, 112 and 202, the last functional board not being visible). The elements 10 and 20 are put into contact on the side walls thereof, and more specifically, on the structural boards 101 and 201 thereof, on the one hand, and 111 and 211, on the other hand. The fixing means $F_{10-20}$ in the form of a line of rod-type assembly members. The members are arranged evenly along the interface between the elements 10 and 20, in an inclined manner, in order to be able to pass through, at the very least, the wood of the boards 101, 201 and 111 (for the first member) and the wood of the boards 101 and 201 (for the three other members).

In a variant illustrated by FIG. 16, the constituent elements 10 and 20 each comprise four superimposed folds (for example, for the element 10, the folds 100, 110, 120 and 130). In this case, a clearance can be arranged between the folds 100 and 110, on the one hand, and the folds 120 and 130, on the other hand (and likewise for the element 20). Subsequently, the fixing members $F_{10-20}$, always in the form of rods, can pass through the successive folds of different constituent elements without being inclined. In FIG. 14, the fixing members $F_{10-20}$ are oriented along the axis (Oz) and pass through at the very least, as regards the first member, successively the boards 201, 211 and 121 (even the board 131, along the length of the fixing member). The boards 201 and 211 belonging to the constituent element 20 and the board 121 (and possibly the board 130) belonging to the constituent element 10, these are well fixed to each other by the fixing members $F_{10-20}$, once again without requiring glue and therefore without suffering from the disadvantages mentioned above linked to the use of glue.

Once again, if rod-type members such as screws are suited to fixing the constituent elements to each other, all types of fixing members can be considered, for example of the sharp tip or twisted tip-type.

Furthermore, as can be seen in FIG. 16, on the contact zone between the folds 100 and 110 of the constituent element 10, the upper and lower faces of the structural board 111 are provided with grooved patterns. These patterns lead to an excess thickness and therefore a free space between the functional boards 102 and 112, which also improves the insulation of the constituent element 10.

Figure 17:
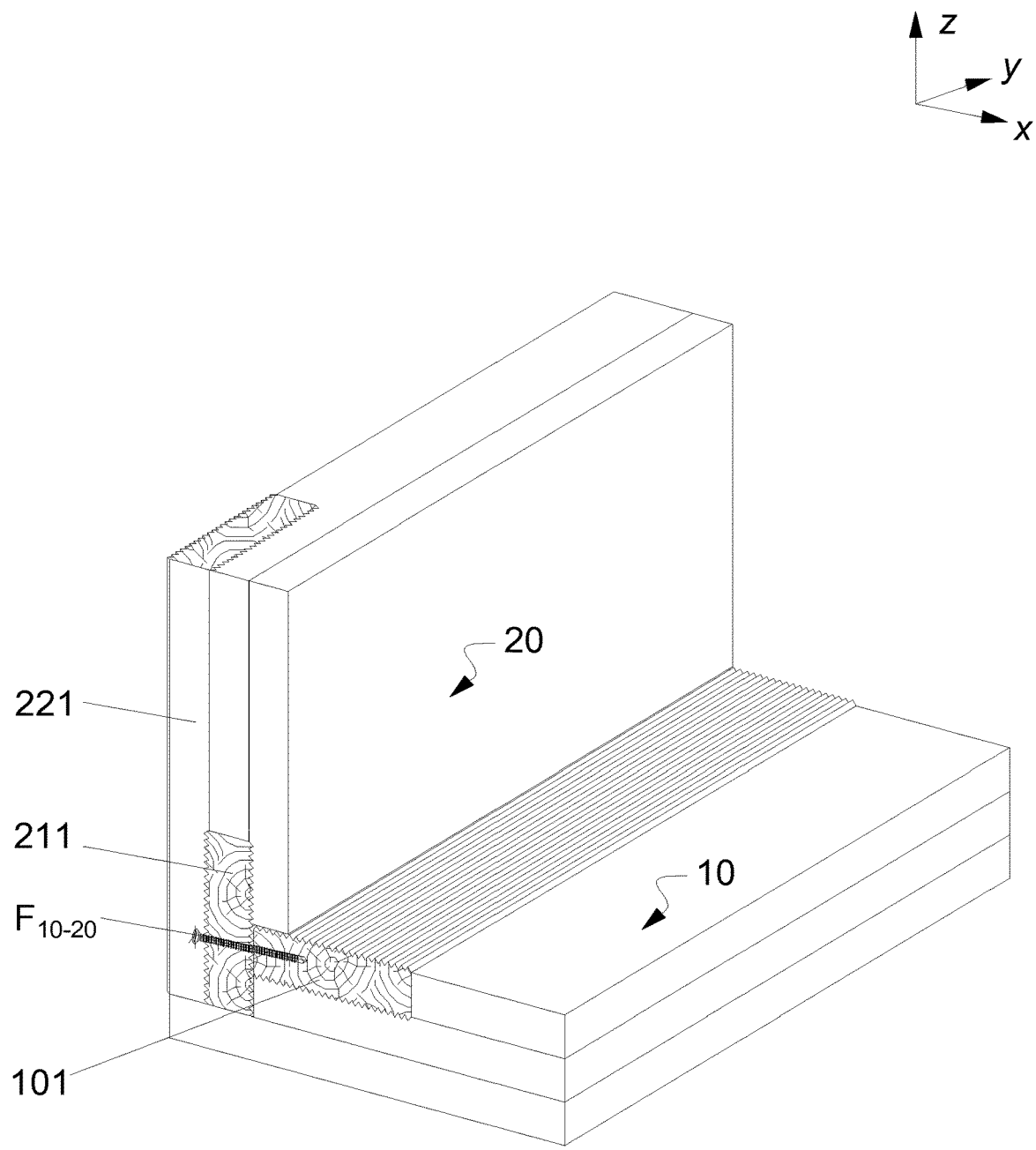
FIG. 17 is a perspective view illustrating the fixing of two orthogonal constituent elements, according to a first embodiment.
Figure 18:
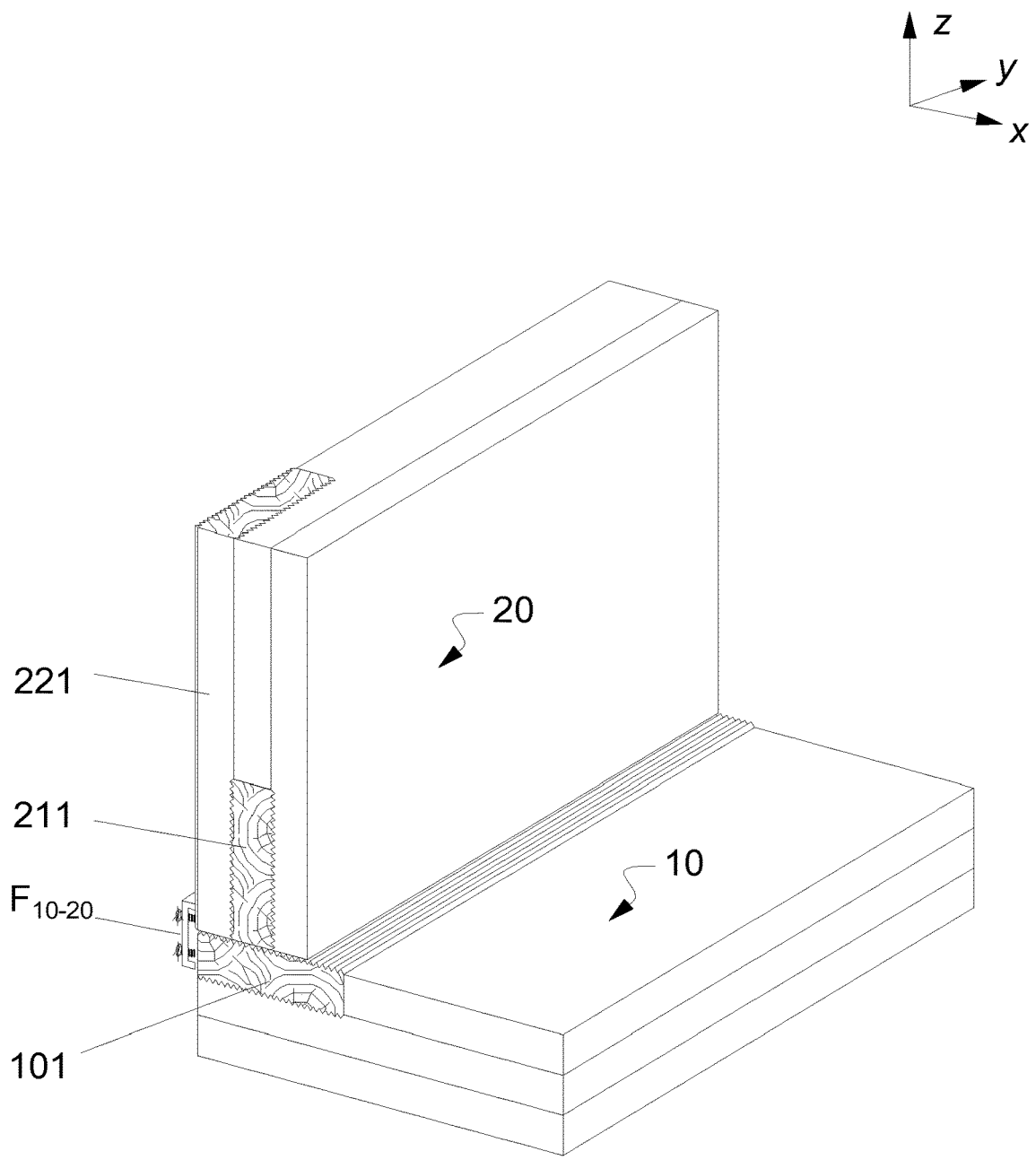
FIG. 18 is a perspective view illustrating the fixing of two orthogonal constituent elements, according to a second embodiment.

FIGS. 17 and 18 represent the case of two orthogonal constituent elements 10 and 20, fixed on the side walls thereof. In the case of FIG. 17, fixing members of rod type $F_{10-20}$ pass through the structural boards 101 (of the element 10) and 211 (of the element 20), which makes it possible to fix the constituent elements 10 and 20 together. Alternatively, in the case of FIG. 18, the fixing members are replaced by the connectors $F'_{10-20}$. These connectors are presented in the form of plates each connecting at least one board of the element 10 and of the element 20, to which are added at least two rod-type members, one passing through the boards of the element 10 and the other passing through the boards of the element 20.

The connectors can be considered as variants to the fixing members. They can also be considered alternatively with these members.

In the configurations illustrated by FIGS. 15 to 18, the structural boards can be machined on all the faces thereof with the grooved patterns, such that the structural boards of the element 10 come into contact with the structural boards of the element 20 and that the sliding of these structural boards against each other—and therefore the sliding of the elements 10 and 20 against each other—is limited.

A construction system 1 according to the present invention can be manufactured, preferably automatically, from structural boards prepared in advance (either by cutting a wide board to the desired dimensions, or by assembling different sparse pieces of wood). In a first step, the faces 101A and 111B of the structural boards 101 and 111 are machined such that they are provided with grooved patterns $R_1$ (and possibly $R_2$), at least one the contact interface $I_{101-111}$ thereof. In a second step, the structural boards 101 and 111, thus machined, are put into contact with each other, on the contact interface $I_{101-111}$ thereof, by using grooved patterns as markers, such that they are interlocked into each other. Thus, the structural boards 101 and 111 can be retained against each other by way of a holding means $M_{101-111}$ (such as described in reference to FIG. 7). These same steps are repeated for each of the structural boards of one same constituent element, up to the complete production of this element. Finally, in a third step, the constituent elements 10 and 20 are fixed to each other by way of fixing means $F_{10-20}$ or $F'_{10-20}$, and so forth for all the constituent elements.

Figure 19:
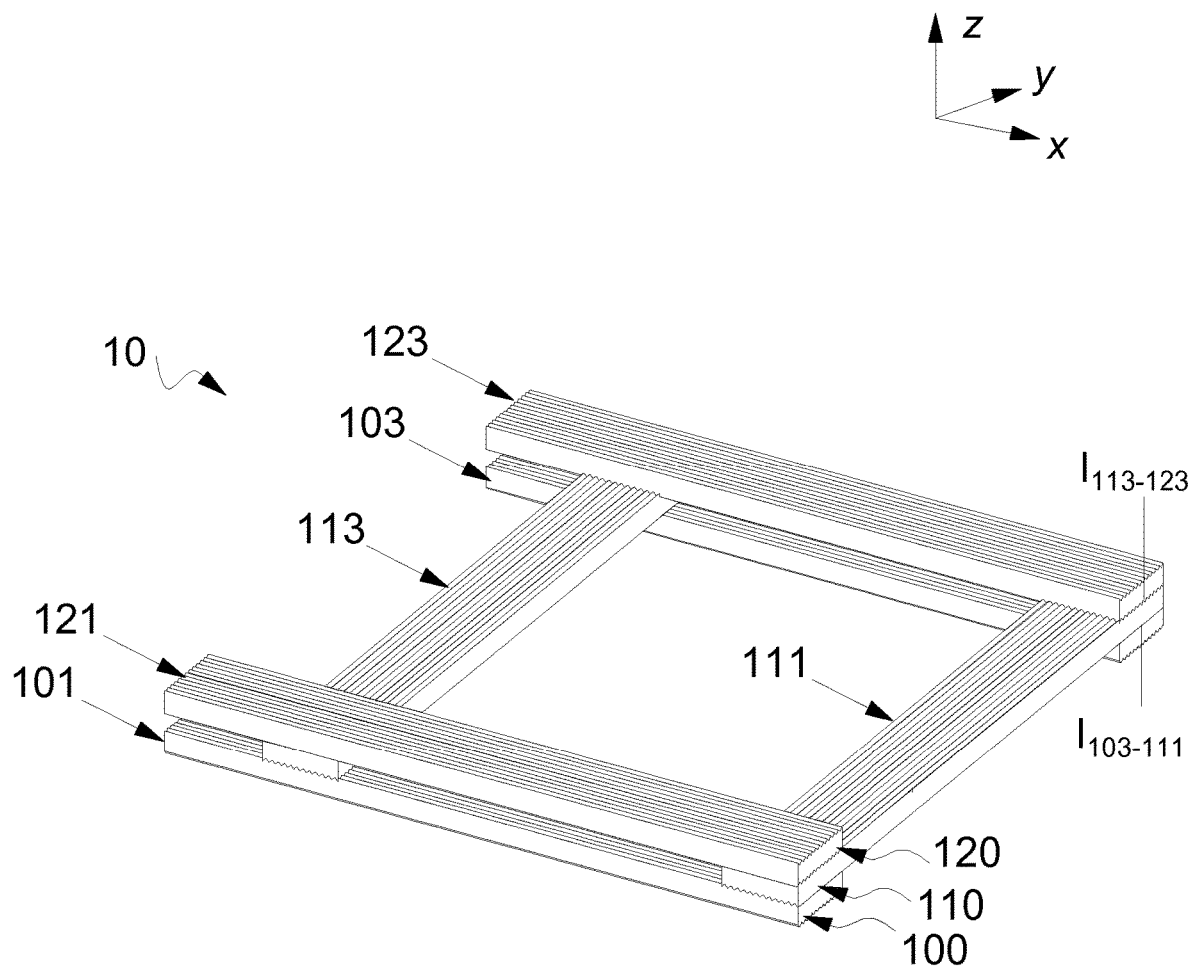
FIG. 19 is a perspective view of a constituent element according to a specific embodiment of the invention.

FIG. 19 illustrates another embodiment of a construction element according to the present invention. In this figure, the construction element 10 is formed of three folds 100, 110 and 120 each of two boards, but a person skilled in the art will know how to adapt this embodiment to a different number of folds and boards. The first fold 100 comprises the boards or crossbeams 101 and 103 along the axis (Ox). The second fold 110 comprises the boards or mounts 111 and 113 along the axis (Oy). Finally, the third fold 120 comprises the boards or crossbeams 121 and 123 along the axis (Ox). The boards of one same fold are parallel to each other and are orthogonal to the boards of an adjacent fold, but a person skilled in the art will know how to adapt this method of orientation to another non-zero inclination of the boards of the two adjacent folds.

To assemble these folds and these boards according to the invention, it is provided to machine, along the length thereof, the faces of the boards intended to be used as a contact interface, in order to provide them with series of parallel grooves ($R_1$ or $R_2$). For each contact interface, one of the faces of the boards in contact is furthermore provided with two series of parallel and orthogonal grooves against each other ($R_1$ and $R_2$) in order to form a matrix of teeth $P_{12}$ in this place. Thus, in the plane of the contact interfaces (Oxy), between the first fold 100 and the second fold 110, the boards are immobilised together along the axis $B_2$ (Ox), and between the second fold 110 and the third fold 120, the boards are immobilised together along the axis $B_1$ (Oy).

Figure 20A:
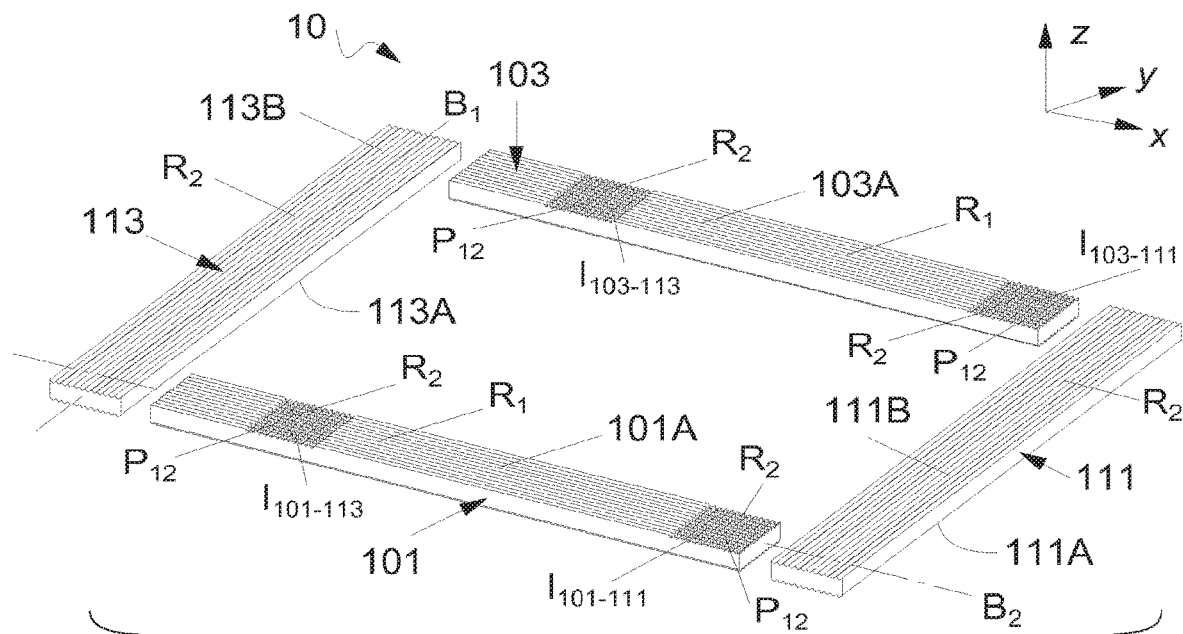
FIGS. 20A and 20B are two perspective views of a first embodiment variant of the construction element of FIG. 19.
Figure 20B:
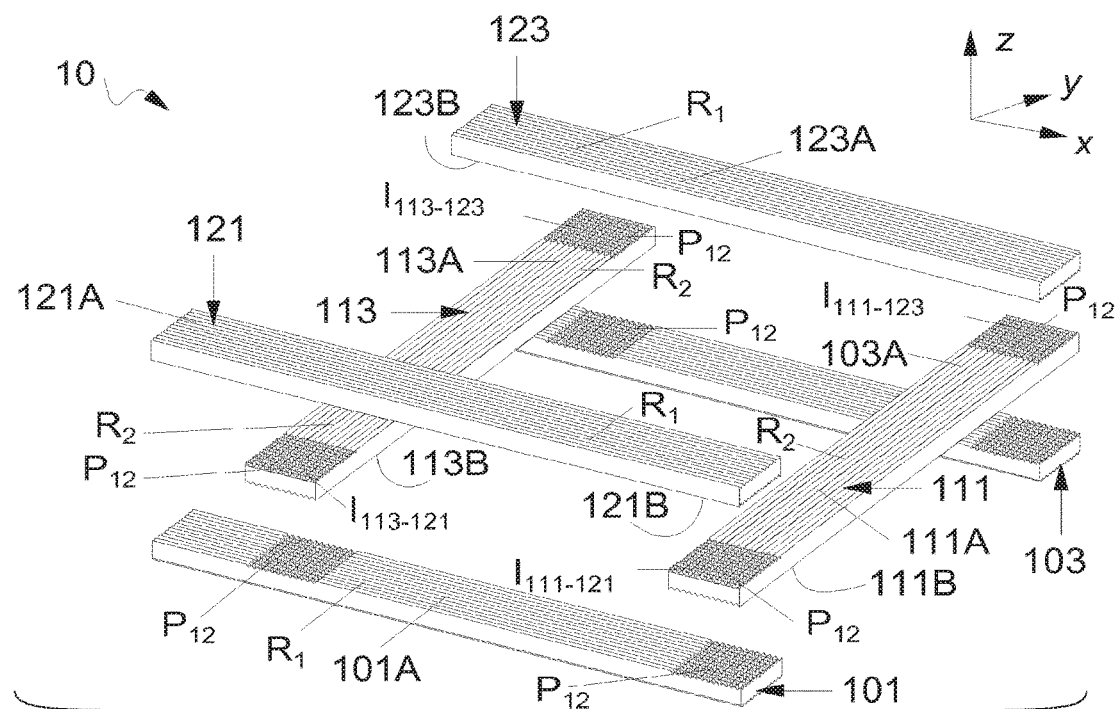

In FIGS. 20A and 20B, representing exploded views of the preceding embodiment, the boards of the first fold 101 and 103 are provided on the upper faces 101A and 103A thereof with parallel grooves $R_1$ along the axis (Ox), over the whole length thereof, as well as two series of parallel grooves $R_2$ along the axis (Oy), over the whole width thereof. The two series of parallel grooves $R_1$ and $R_2$ form matrices of teeth $P_{12}$. The boards of the second fold 111 and 113 are provided on the lower faces 111B and 113B thereof (visible in FIG. 20A, as the boards 111 and 113 are returned there) with parallel grooves $R_2$ along the axis (Oy). When the lower faces 111B and 113B are superimposed on the upper faces 101A and 103A, the grooves $R_2$ on the lower faces 111B and 113B cooperate with the teeth $P_{12}$ on the upper faces 101A and 103A on the contact interfaces $I_{101-111}$, $I_{101-113}$, $I_{103-111}$ and $I_{103-113}$ thereof to prevent the sliding of the folds 100 and 110 against each other along the axis $B_2$ (Ox) (the contact interfaces being situated on the teeth $P_{12}$).

In FIG. 20B, it can be seen that these are the upper faces 111A and 113A of the boards of the second fold 101 and 103 which are provided with parallel grooves $R_2$ along the axis (Oy), as well as two sets of parallel grooves $R_1$ along the axis (Ox) to form two sets of teeth $P_{12}$. The lower faces 121B and 123B of the boards of the third fold 121 and 123 are provided with parallel grooves $R_1$ along the axis (Ox). Thus, when the lower faces 121B and 123B are superimposed on the upper faces 111A and 113A, the grooves $R_1$ on the lower faces 121B and 123B cooperate with the teeth $P_{12}$ on the upper faces 111A and 113A on the contact interfaces $I_{111-121}$, $I_{111-123}$, $I_{113-121}$ and $I_{113-123}$ thereof to prevent the sliding of the folds 110 and 120 against each other along the axis $B_1$ (Oy). Thus, the sliding of the constituent element is prevented in the plane of the contact interfaces (Oxy), the interfaces between the folds 100 and 110 preventing the sliding along the axis $B_2$ (Ox) and the interfaces between the folds 110 and 120 preventing the sliding along the axis $B_1$ (Oy).

Figure 21A:
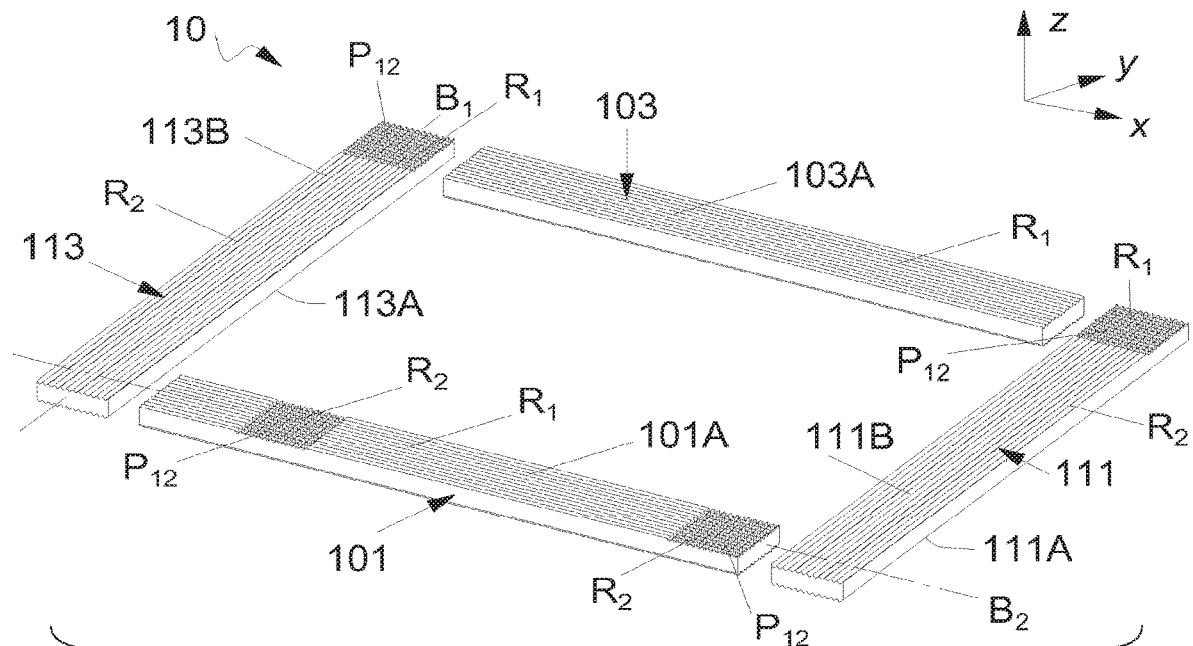
FIGS. 21A and 21B are two perspective views of a second embodiment variant of the construction element of FIG. 19.
Figure 21B:
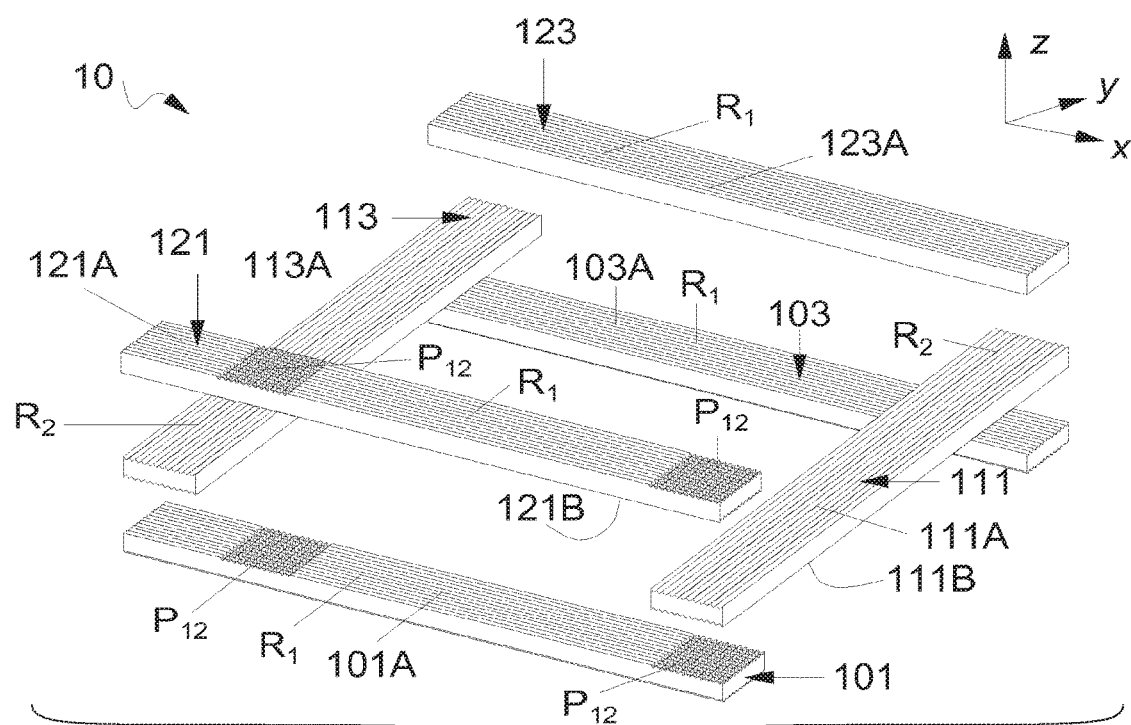

The variant of FIGS. 21A and 21B is similar to that of FIGS. 20A and 20B, except for the teeth $P_{12}$ are arranged here as follows: two sets of teeth on the upper face 101A of the board 101, a set of teeth on the lower face 111B of the board 111, a set of teeth on the lower face 113B of the board 113, then, again, two sets of teeth on the lower face 121B of the board 121 and on the lower face 123B of the board 123. The relative sliding of the folds 100 and 110 is thus ensured in the whole plane of the interfaces (Oxy).

Figure 22A:
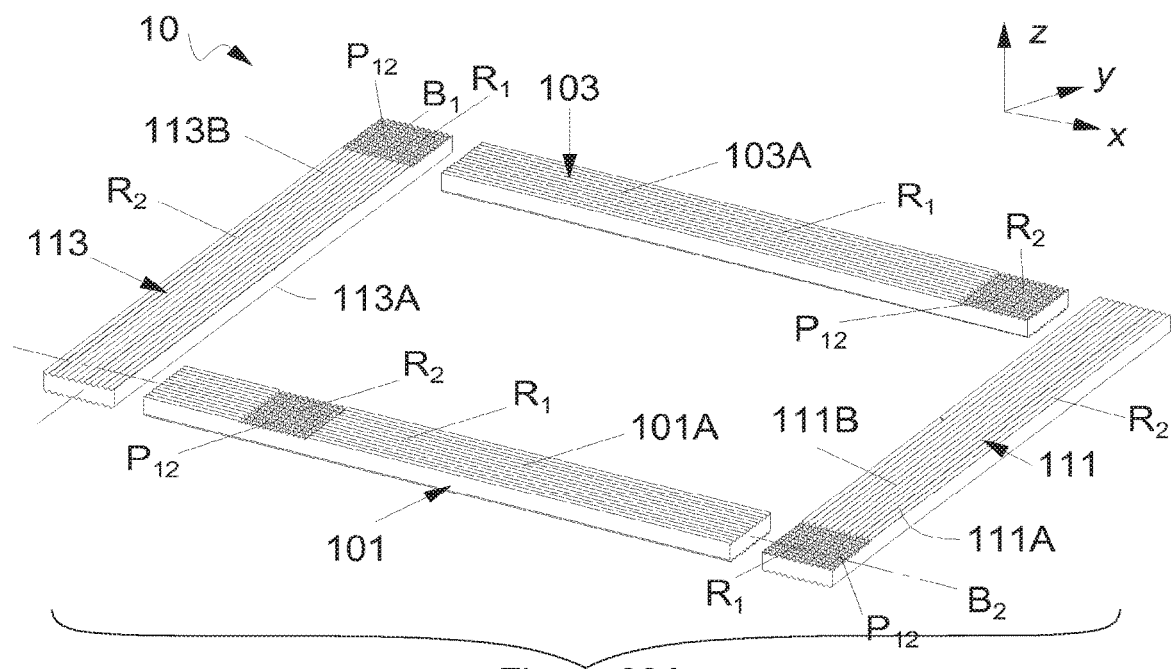
FIGS. 22A and 22B are two perspective views of a third embodiment variant of the construction element of FIG. 19.
Figure 22B:
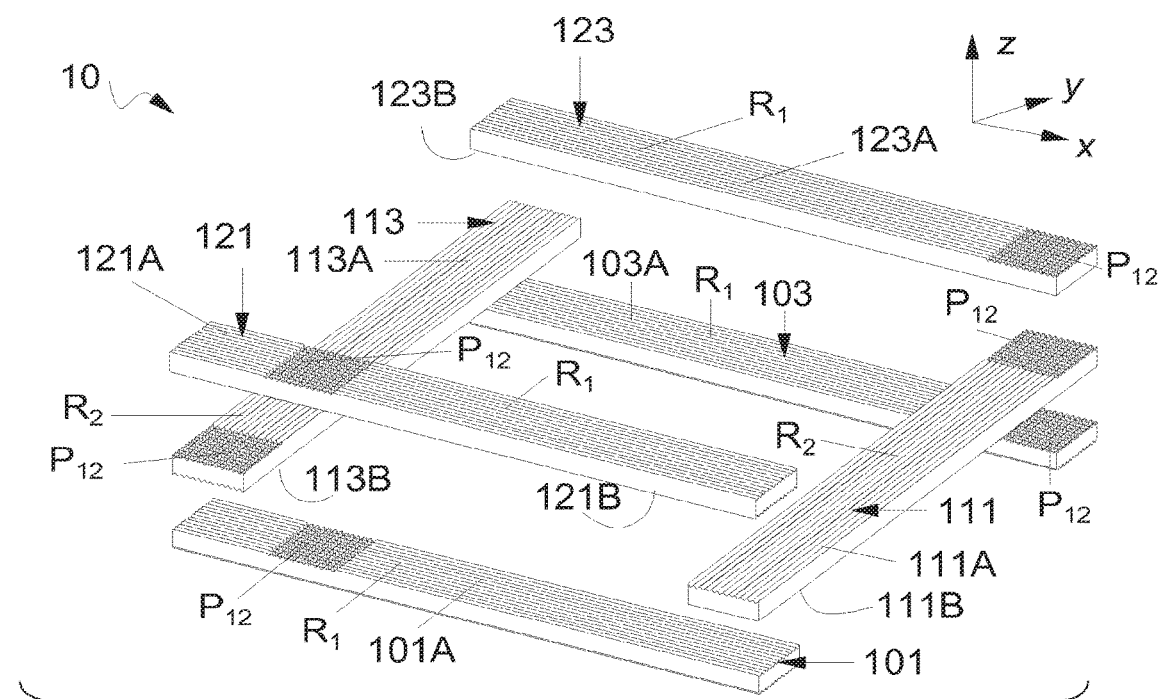

The variant of FIGS. 22A and 22B is itself also similar to that of FIGS. 20A and 20B, except for the teeth $P_{12}$ are arranged as follows: a set of teeth on the upper face 101A of the board 101 and on the upper face 103A of the board 103, a set of teeth on the lower face 111B of the board 111 and on the upper face 111A of the board 111, a set of teeth on the lower face 113B of the board 113 and on the upper face 131A of the board 113, a set of teeth on the lower face 121B of the board 121 and on the lower face 123B of the board 123. The relative sliding of the folds 100 and 110, on the one hand, and the folds 110 and 120, on the other hand, the whole plane (Oxy) is thus ensured.

In each case, the immobilisation is thus ensured in the plane of the contact interfaces (Oxy) by a set of longitudinal grooves and of teeth arranged suitably on the boards of the constituent element. This embodiment makes it possible to simply achieve the two immobilisation axes, since all that is needed, is to machine the faces of the boards along the lengths thereof and/or the widths thereof to form the grooves and/or teeth.

Of course, the present invention is not limited to the examples and to the embodiments described and represented, but it is likely for numerous variants accessible for a person skilled in the art.

The invention claimed is:

1. A construction system comprising:
a floor, at least one wall, and a ceiling, each of the floor, the at least one wall, and the ceiling being divided into a set of constituent elements, each constituent element of the set of constituent elements comprising at least three superimposed folds, each of the at least three superimposed folds comprising at least two structural boards,
wherein each of the floor, the at least one wall, and the ceiling are divided into the set of constituent elements with a cutting which keeps to sizing limits of transport and of industrial tools to thereby enable manufacture and transport of the set of constituent elements,
wherein a first face of the at least two structural boards of a first fold of the at least three superimposed folds is in contact with a face of the at least two structural boards of a second fold of the at least three superimposed folds on a first contact interface, and a second face of the at least two structural boards of the first fold is in contact with at least one structural board of a third fold of the at least three superimposed folds on a second contact interface, the first fold being intermediate and adjacent to the second and third folds,
wherein at least two of the constituent elements are fixed together by a fixing assembly,
wherein the first fold among the superimposed folds of one of the set of constituent elements is retained against the second fold by a first holding assembly, and the first fold is retained against the third fold by a second holding assembly,
wherein the fixing assembly and the holding assembly comprise non-adhesive assemblies,
wherein the faces in contact at each contact interface are at least partially provided, on said contact interface, with a set of grooved patterns arranged so as to prevent a sliding of said structural boards against each other along at least one first immobilization axis,
wherein, on each contact interface, the grooved patterns of the at least two structural boards of the first fold comprise a first series of parallel grooves and a second series of parallel grooves oriented respectively along a first axis and a second nonparallel axis,
wherein a functional board is inserted between two structural boards of one of the at least three superimposed folds.

2. The construction system according to claim 1, wherein on the first contact interface, the face of each of the at least two structural boards of the second fold is provided with a first series of parallel grooves oriented along the first axis so as to prevent the sliding of said structural boards of the first and second folds against each other along said first immobilization axis.

3. The construction system according to claim 2, wherein the grooved patterns are arranged to also prevent the sliding of said structural boards against each other along at least one second immobilization axis not parallel to the first immobilization axis.

4. The construction system according to claim 1, wherein the grooved patterns are arranged to also prevent any sliding of said structural boards against each other along at least one second immobilization axis not parallel to the first immobilization axis.

5. The construction system according to claim 4, wherein the grooved patterns comprise the first series of parallel grooves and the second series of parallel grooves, oriented respectively along the first axis orthogonal to the first immobilization axis and the second axis orthogonal to the second immobilization axis.

6. The construction system according to claim 1,
wherein the second face of the at least two structural boards of the first fold is in contact with at least two structural boards of the third fold on the second contact interface,
wherein on the second contact interface, the face of a structural board in the at least two structural boards of the third fold is provided with a first series of parallel grooves oriented along the first axis so as to prevent the sliding of said structural boards of the first and third folds against each other along said first immobilization axis; and
wherein on the second contact interface, the face of a second structural board in the at least two structural boards of the third fold is provided with a second series of parallel grooves oriented along the second axis so as to prevent the sliding of said structural boards of the first and third folds against each other along said second immobilization axis.

7. The construction system according to claim 1, wherein the grooved patterns have cross-sections of substantially triangular shape.

8. The construction system according to claim 1, wherein a top of each of the grooved patterns has an angle of between 40 and 70 degrees.

9. The construction system according to claim 1, wherein, on at least one portion of the contact interface, the grooved patterns are interlocked at least partially into each other.

10. The construction system according to claim 1, wherein the face of at least one structural board of the second or third fold, oriented towards the first fold, is arranged on the contact interface with the grooved pattern, so as to arrange a space between a functional board of the second or third fold and a functional board of the first fold.

11. The construction system according to claim 1, wherein the non-adhesive holding assembly comprises assembly members having a rod shape.

12. The construction system according to claim 1, wherein the non-adhesive fixing assembly comprises assembly members having a rod shape.

13. The construction system according to claim 1, wherein the grooved patterns have cross-sections of a non-triangular shape.

14. The construction system according to claim 13, wherein the grooved patterns have cross-sections of a wave-shaped pattern.

15. The construction system according to claim 13, wherein the grooved patterns have a square cross-section.

16. The construction system according to claim 1, wherein one or more of the first holding assembly and the second holding assembly comprise a plate connector.

17. The construction system according to claim 1, wherein the grooved patterns of at least one structural board of the at least two structural boards of the first fold are offset from an end of the at least one structural board.

18. The construction system according to claim 1, wherein a base of each the grooved patterns has a width between 1 and 15 millimeters.

* * * * *